United States Patent
Doebelin et al.

(10) Patent No.: US 11,823,074 B2
(45) Date of Patent: Nov. 21, 2023

(54) INTELLIGENT COMMUNICATION MANAGER AND SUMMARIZER

(71) Applicant: ACCENTURE GLOBAL SOLUTIONS LIMITED, Dublin (IE)

(72) Inventors: Coline Doebelin, Biot (FR); Christian Souche, Cannes (FR); Victor Chevalier, Strasbourg (FR)

(73) Assignee: ACCENTURE GLOBAL SOLUTIONS LIMITED, Dublin (IE)

(*) Notice: Subject to any disclaimer, the term of this patent is extended or adjusted under 35 U.S.C. 154(b) by 910 days.

(21) Appl. No.: 16/831,466

(22) Filed: Mar. 26, 2020

(65) Prior Publication Data

US 2020/0327432 A1 Oct. 15, 2020

Related U.S. Application Data

(60) Provisional application No. 62/832,080, filed on Apr. 10, 2019.

(51) Int. Cl.
| | | |
|---|---|---|
| *G06Q 30/00* | (2023.01) | |
| *G06N 5/04* | (2023.01) | |
| *G06N 5/02* | (2023.01) | |
| *G06Q 10/1053* | (2023.01) | |

(52) U.S. Cl.
CPC ............ *G06N 5/04* (2013.01); *G06N 5/02* (2013.01); *G06Q 10/1053* (2013.01)

(58) Field of Classification Search
None
See application file for complete search history.

(56) References Cited

U.S. PATENT DOCUMENTS

| | | | |
|---|---|---|---|
| 2013/0262501 A1* | 10/2013 | Kuchmann-Beauger | G06F 16/24535 707/769 |
| 2016/0196491 A1* | 7/2016 | Chandrasekaran | G06F 16/248 706/50 |
| 2020/0184425 A1* | 6/2020 | Mondal | G06F 16/285 |

\* cited by examiner

*Primary Examiner* — Matthew T Sittner
(74) *Attorney, Agent, or Firm* — Mannava & Kang, P.C.

(57) ABSTRACT

Examples of a system for intelligent communication management for content summarization are provided. In an example, the system receives a summary generation requirement. The system establishes a question database for generation a set of questions for a user corresponding to the summary generation requirement. The system implements an artificial intelligence component to sort the answers obtained from the question and generates a user-specific knowledge database. The system may use the user-specific knowledge model for generation of further questions for the user. The system may assist a user with collecting information in a conversational manner mode and to automatically produce intelligible deliverables. The system may accept multiple modes of input while collecting information from a user. The system may be used for an automatic summary generation for customer service conversations, interviews, conferences and presentations, a person's holiday chronicles, and the like. The system may be used for generating minutes for meetings.

20 Claims, 12 Drawing Sheets

Story 516 with illustrations

 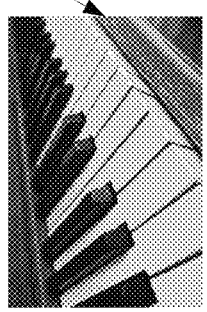 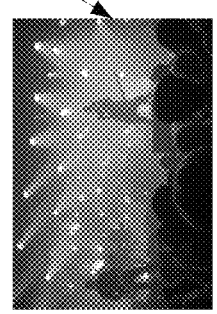

522

The advice I would give to 16-years-old would tell to stop worrying. My best friends came from meeting new people and doing new things.

I love music I go to concert I played the piano during my retirement. I practiced with my best friend a violinist.

I learned to play as child and stopped as I was a teenager. I didn't get back into piano in my forties. I was encouraged by friends to go into it and wanted for concerts.

*FIG. 5B*

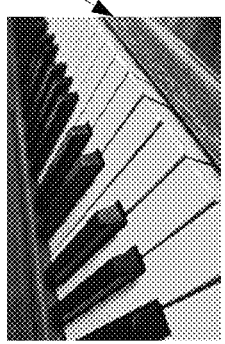
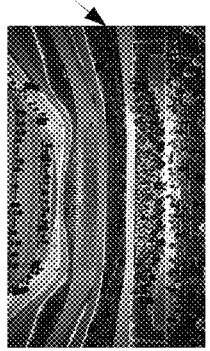

Formatted Story 528

The advice I would give to 16-years-old would be to stop worrying. My best friends came from meeting new people and doing new activities.

I love music and going to concert, I played the piano during my retirement. I practiced with my violinist best friend.

I learned to play the piano as a child and stopped when I was a teenager. I didn't get back into piano until my forties. I was encouraged by my friends to go back into it and I was wanted for concerts.

FIG. 5C

INTELLIGENT COMMUNICATION MANAGER AND SUMMARIZER

PRIORITY CLAIM

The present disclosure claims priority to U.S. Provisional Application Ser. No. 62/832,080 filed on Apr. 10, 2019, the disclosure of which is incorporated by reference in its entirety herein.

BACKGROUND

With the constant development in technology, the content available to a computer user or an Internet user is increasing with each passing day. However, there is a vast amount of content available "offline" in the form of knowledge and memories stored in the mind of a human being who may not be comfortable with the use of computers. There is a need to somehow obtain this "offline" information and store it in a computer compatible format usable by current and future users who are familiar with the use of computers. The advent of digitization has enabled computer users to digitize a majority of personal and professional content available off-line. With the increase in data available to a user that can be stored in a computer compatible format, there has been an increasing demand for organizing such data for the user in a summarized format for improving data accessibility and decreasing the time required for understanding the content presented by the data.

For example, a user may aspire to organize his/her holiday chronicles in a digital format. Such a task would be cumbersome and time-consuming if a user were to manually enter the data into a computer system. Such a manual data entry system would also suffer from standard human errors, for example, a user may forget to chronicle a particular event while making their holiday memoirs.

There are various methods available to a user for automation of the data entered into a computer system. These methods include, for example, using a memory application on a mobile phone or over the Internet, a diary application with a voice assistant and an auto minute meeting generation platform. The memory applications on a mobile phone or over the Internet create a book from memories and photos. The memories are organized in a timeline. They may be registered with dictation from a mobile device. However, the memory application on a mobile phone or over the Internet does not summarize the memories recorded therein, thereby making it difficult for others such as, for example, a next-generation family member to enjoy the created book. The diary application with the voice assistant deploys voice assistant skills or actions that may allow a user to record log, sentence by sentence. The user may re-read the content later. However, a diary application on voice assistant suffers from various drawbacks including no summary generation. Additionally, no assistance, which might help a user in remembering information may be offered.

Furthermore, there may be a need to record entire data using audio input. A mobile application such as, for example, an auto minute meeting generation platform, may record and create a summary of a meeting using a dictation mode. However, such an application requires a digital input and does not provide a voice user interface. These systems make the process of summarization cumbersome and inaccurate. In addition, existing solutions do not allow for a system to automatically create new or follow up questions in real-time based on, for example, a response received to an initial or preceding question or an observation made by a speaker in a conversation.

Accordingly, a technical problem with the currently available summary generators is that they may be inefficient, and inaccurate. There is a need for an optimized summary generator that is capable of a continuous prompting and summarizing paradigm, which includes the constant sensing of multiple user inputs (e.g., audio, video, and multimedia) and the opportunities presented therein to create follow up questions in real-time based on the input received.

BRIEF DESCRIPTION OF DRAWINGS

FIG. 5B illustrates a summarization created by the deployment of the system for intelligent communication management for content summarization, according to an example embodiment of the present disclosure.

FIG. 5C illustrates a formatted story created by the deployment of the system for intelligent communication management for content summarization, according to an example embodiment of the present disclosure.

DETAILED DESCRIPTION

Figure 1:
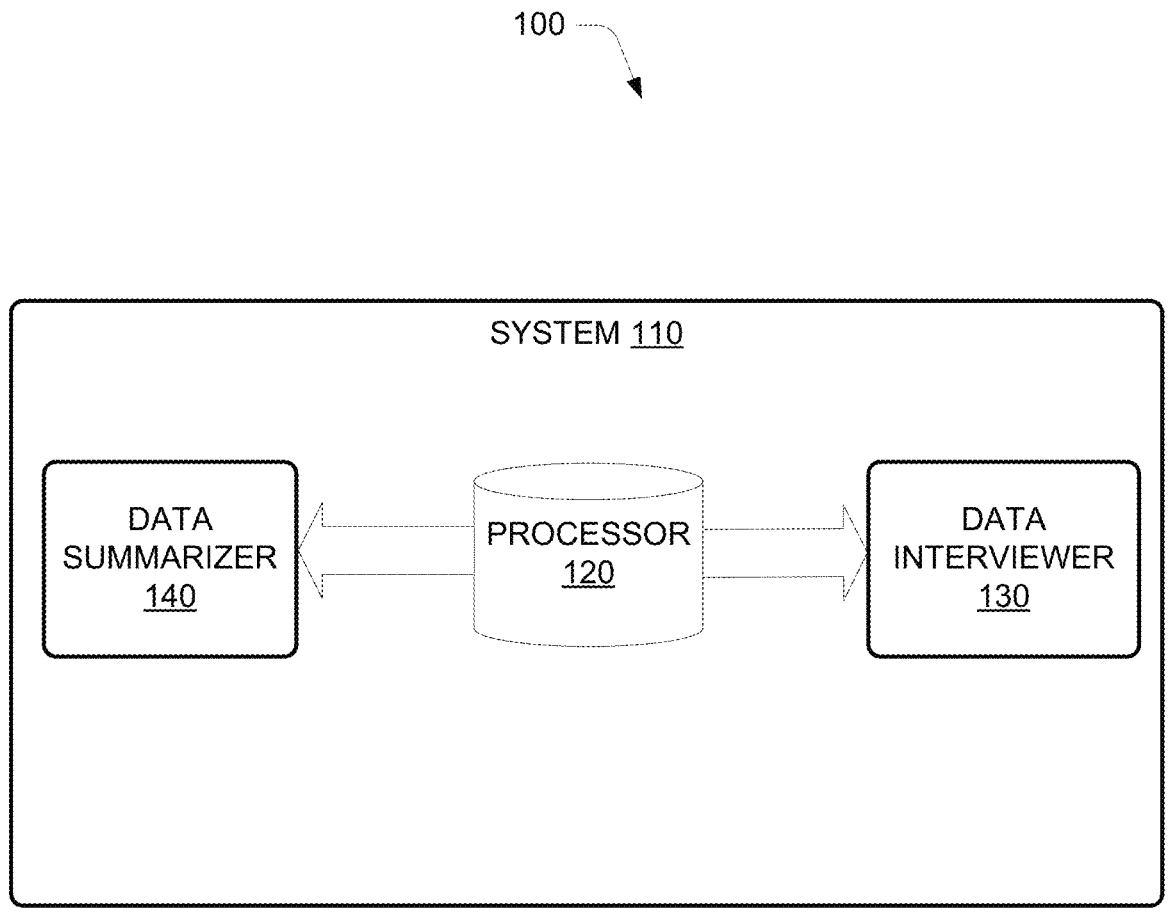
FIG. 1 illustrates a diagram for a system for intelligent communication management for content summarization, according to an example embodiment of the present disclosure.

For simplicity and illustrative purposes, the present disclosure is described by referring mainly to examples thereof. The examples of the present disclosure described herein may be used together in different combinations. In the following description, details are outlined to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to.

The present disclosure describes a system and method for intelligent communication management for content summarization (ICGCS), according to an example embodiment of the present disclosure. The system for intelligent communication management for content summarization may be referred to as system hereafter, for simplicity. The system may assist a user with collecting information in a conversational mode and to automatically produce intelligible deliverables. For instance, this disclosure may assist elderly people in sharing their story with a younger generation, through the help of artificial intelligence. The system may accept multiple modes of input while collecting information from a user. For example, the system may accept a voice answer, content from social media like Twitter®, Facebook®, LinkedIn®, Instagram®, Pinterest®, and the like. In an example, the system may accept input in the form of multimedia. The multimedia may include content that uses a combination of different content forms such as text, audio, images, animations, video, and interactive content. Further, the system may generate sentences automatically to output the story. In an example, the output may be rendered as a video, a book, a blog or another digital support. The system may use the opportunities presented by user inputs for prompting further inputs from the user and provide a summarized output in multimedia or physical format of choice of the user. For sake of brevity and technical clarity, the data collected through conversational interactions mixing pre-defined questions and new questions generated "on the fly" during the interaction may be referred to as "user data" hereinafter.

In accordance with an embodiment of the present disclosure, the system may include a processor, a data interviewer, and a data summarizer. The processor may be coupled to the data interviewer and the data summarizer. The data interviewer may further include a question creator and an answer analyzer. The question creator may generate a first question for a user. The first question may be associated with a summary generation requirement sent to the system by a user. The question creator may receive question data from a plurality of data sources. The question data may be associated with the first question generated for the user by the system. The question creator may obtain an answer for the first question from the user. The question creator may implement a first artificial intelligence component to sort the question data and the obtained answer into a plurality of data domains. The question creator may analyze the plurality of data domains to generate a question database. The question creator may update the question database based on a modification in a domain from the plurality of data domains. The question creator may generate a new question for the user. The new question may be associated with the obtained answer for the first question and the question database.

The data interviewer may further include an answer analyzer. The answer analyzer may implement a second artificial intelligence component to extract information from each obtained answer. The answer analyzer may generate a knowledge database from the information extracted from each obtained answer. The answer analyzer may associate the summary generation requirement of the user with the knowledge database to generate and/or enrich a user-specific knowledge model.

The system may include a data summarizer. The data summarizer may further include a text summarizer, a data assembler, a layout generator, and a modeler. In an example, the text summarizer may obtain the user-specific knowledge model from the answer analyzer. The text summarizer may implement a third artificial intelligence component to generate a report from a user-specific knowledge model. The report may be associated with the summary generation requirement of the user. The data assembler may obtain report data from the plurality of data sources. The report data may be associated with the report generated from the user-specific knowledge model. Further, the data assembler may map the report data with the report generated from the user-specific knowledge model to generate an augmented report. The augmented report may indicate an automatic enrichment of the report generated from the user-specific knowledge model. The data summarizer may further include the layout generator. The layout generator may obtain the augmented report from the data assembler. The layout generator may modify the augmented report to generate a summary report. The summary report may be associated with the summary generation requirement of the user.

Accordingly, the present disclosure aims to make the tedious tasks of generating an interview dialog with a user, compiling and summarizing digital data assimilated through the interview dialog simpler and efficient. Furthermore, the system may then analyze various categories of user data, based on the user-specific knowledge models to accurately interpret the inputs received from the user. Because the system may capture all relevant elements (processes and/or features) of a guideline and the subsequent generation of an interview dialog and analysis of a summarizing requirement may be performed based on knowledge models corresponding to the elements, the analysis may be substantially free from errors.

FIG. 1 illustrates a system for intelligent communication management for content summarization 110 (referred to as system 110 hereinafter), according to an example implementation of the present disclosure. In an example, the system 110 may include a processor 120, a data interviewer 130, and a data summarizer 140. The processor 120 may be coupled to the data interviewer 130 and the data summarizer 140.

In accordance with an exemplary embodiment of the present disclosure, the data interviewer 130 may be configured to execute the data collection stage mentioned above. In an example, the data summarizer 140 may be configured to execute the data summarization stage and visualization stage mentioned above. In an example, the data interviewer 130 may further include a question creator and an answer analyzer. The question creator may generate a first question for a user. The first question may be associated with a summary generation requirement sent to the system 110 by a user. The question creator may receive question data from a plurality of data sources. In an example, the plurality of data sources further comprises at least one of a combination of different content forms such as text, audio, an image, an animation, a video, and interactive content. The question data may be associated with the first question generated for the user by the system 110. The question creator may obtain an answer for the first question from the user. Further, the question creator may implement a first artificial intelligence component to sort the question data and the obtained answer into a plurality of data domains. The question creator may analyze the plurality of data domains to generate a question database. The question database may be updated based on a modification in a domain from the plurality of data domains. The first artificial intelligence component may be one of a data extractor, a data classifier, a data associator, a data comparer, a relationship extractor, and a dependency parser and the like (further explained by way of FIG. 2).

Further, the question creator may generate a new question for the user. In an example, the new question may be associated with the obtained answer for the first question and the question database. In an example, the answer obtained from the user may include an audio input. The new question may be a question identified by the system 110 as relevant to the obtained answer from the question database. In an example, the new question may be a question generated according to a user response for the first question. In an example embodiment, the question creator will generate the first question and obtain an answer for the same. The question creator may then generate the new question according to the obtained for the first question. The system 110 may obtain an answer to the new question. The question creator may create a question loop for generating the question database. The question loop may be based on at least one of the first question, the answer for the first question, and the new question. The question creator may generate a question loop, wherein each question would be treated as the first question and the new question alternatively. For example, the new question may be treated as a preceding question for further generation of another question, thereby equating the new question with the first question described above. In an example, the first question may be a subsequent question generated in response to the preceding question.

In accordance with an embodiment of the present disclosure, the data interviewer further includes an answer analyzer. The answer analyzer may implement a second artificial intelligence component to extract information from each obtained answer. The answer analyzer may generate a knowledge database from the information extracted from each obtained answer. The answer analyzer may associate the summary generation requirement of the user with the knowledge database to generate a user-specific knowledge model. The answer analyzer may associate the summary generation requirement of the user with the knowledge database to generate and enrich the user-specific knowledge model.

As mentioned above the system 110 may include the data summarizer 140. The data summarizer 140 may further include a text summarizer, a data assembler, a layout generator, and a modeler. In an example, the text summarizer may obtain the user-specific knowledge model from the answer analyzer. Further, the text summarizer may implement a third artificial intelligence component to generate a report from the user-specific knowledge model. The report may be associated with the summary generation requirement of the user. Further, the data assembler may obtain report data from the plurality of data sources. The report data may be associated with the report generated from the user-specific knowledge model. Further, the data assembler may associate the report data with the report generated from the user-specific knowledge model to generate an augmented report. The augmented report may indicate an automatic enrichment of the report generated from the user-specific knowledge model. In an example, the automatic enrichment may be accomplished through one or more additional resources. In an example, the additional sources may be identified by the system 110 as being related to the report generated from the user-specific knowledge model. For example, the additional sources may include information from a social media account of the user from whom the user data may have been collected thus far. In an example, the additional source may be a multimedia resource such as a picture that may be related to the user data, and the report data collected thus far. The data summarizer 140 may further include the layout generator. The layout generator may obtain the augmented report from the data assembler. Further, the layout generator may modify the augmented report to generate a summary report. The summary report may be associated with the summary generation requirement of the user. In an example, the data summarizer 140 may provide the summary report to the user as a content form comprising at least one of a text, audio, an image, an animation, a video, and an interactive content. In an example, the data summarizer 140 may further obtain a user feedback from the user to generate a modification in the summary report. In an example, the system 110 may be configured to generate a feedback loop for generating modifications in the summary report until the user of the system 110 may deem the report satisfactory.

In an example, the data summarizer 140 may generate a knowledge graph for each of the user-specific knowledge models. The knowledge graph may comprise visualization of the user-specific knowledge model. The knowledge graph may be an aspect of the visualization stage mentioned above. In an example, the first artificial intelligent component may further obtain input from the user-specific knowledge model to generate an update in the question database. The modeler may initiate a summary generation to resolve the summary generation requirement based on the summary report.

The system 110 may include supporting human decision making for efficient and continuous analysis of the user data, which in turn provides for continuous, efficient and accurate analysis of the summary generation requirement of a user. The system 110 may be configured to support human decision making for processing a summarizing requirement. Furthermore, the system 110 may then analyze various categories of user data, based on the user-specific knowledge models to accurately interpret the inputs received from the user. Because system 110 may capture all relevant elements (processes and/or features) of a guideline and the subsequent analysis of a summarizing requirement may be performed based on knowledge models corresponding to the elements, the analysis may be substantially free from errors.

In accordance with various embodiments of the present disclosure, the system may be relevant for various operations associated with an industry, an organization, and a technological sector. In an example, the system may be used for an automatic summary generation for customer service conversations. The system may also be used for an automatic summary generation of interviews. The system may also be used for an automatic summary generation of a person's holiday chronicles. In addition, or alternatively, the system may be used for automatic generation of minutes for meetings. The system may also be used for an automatic summary generation of conferences and presentations. For example, the system may be used for the generation of summary from keynote presentations. One of ordinary skill in the art will appreciate that the use cases mentioned above are non-limiting examples only. The present disclosure may be used in any setting, which requires the automatic summarization of any content.

The system may be executed in various stages. These stages may include, for example, a data collection stage, a data summarization stage, and a visualization stage. Each of these stages has been described in this disclosure document. In accordance with an embodiment of the present disclosure, the data collection stage may include collecting data information through conversational interactions mixing predefined questions and new questions generated on the fly during the interaction. The additional sources may be identified by the system as being related to the user data collected. In accordance with an embodiment of the present disclosure, the multimedia content may be accepted as an input medium by the system. The system may accept multiple modes of input while collecting information from a user. For example, the system may accept a voice answer, content from social media like Twitter®, Facebook®, LinkedIn®, Instagram®, Pinterest®, and the like. The multimedia may include content that uses a combination of different content forms such as text, audio, images, animations, video, and interactive content. In an example, the multimedia content may be generated by the system in response to an input received by the system from a user. In an example, the system may generate a summary automatically to output a story. For example, the additional sources may include information from a social media account of the user from whom the user data may have been collected thus far. In an example, the additional source may be a multimedia resource such as, for example, a picture that may be related to the user data collected thus far. The user data may be enriched with additional sources by the system.

In accordance with an embodiment of the present disclosure, the data summarization stage may include the generation of a transcribed answer to the predefined questions and new questions (mentioned above). The transcribed answer may be then summarized to create an impactful story. The system may use artificial intelligence and human intervention for the generation of an impactful story. In an example, the system may deploy a feedback loop with a professional writer to improve the result of the artificial intelligence techniques used. In accordance with an embodiment of the present disclosure, the system may generate an output as part of the visualization stage. In an example, a display may be generated for the impacted full story. The display may be in the form of a book, a video, digital content or any combination thereof.

Accordingly, the present disclosure aims to make the tedious tasks of generating an interview dialog with a user, compiling and summarizing digital data assimilated through the interview dialog easier and more efficient. Generating an interview dialog may include analyzing a response or a comment received during a conversation, analyzing the response or comment, formulating one or more questions in real-time based on the analysis, and posing the formulated question to the person to elicit additional information during the conversation. In an example embodiment, the conversation may be an interview. In an alternative example embodiment, the conversation may be an informal chat between two or more persons. The present disclosure provides for efficient and continuous analysis of the user data, which in turn provides for continuous, efficient and accurate analysis of the interview dialog and the summary generation requirement of a user. The system may be configured to support human decision making for processing a summarizing requirement. Furthermore, the system may then analyze various categories of user data, based on the user-specific knowledge models to accurately interpret the inputs received from the user. Because the system may capture all relevant elements (processes and/or features) of a guideline and the subsequent generation of an interview dialog and analysis of a summarizing requirement may be performed based on knowledge models corresponding to the elements, the analysis may be substantially free from errors.

Figure 2:
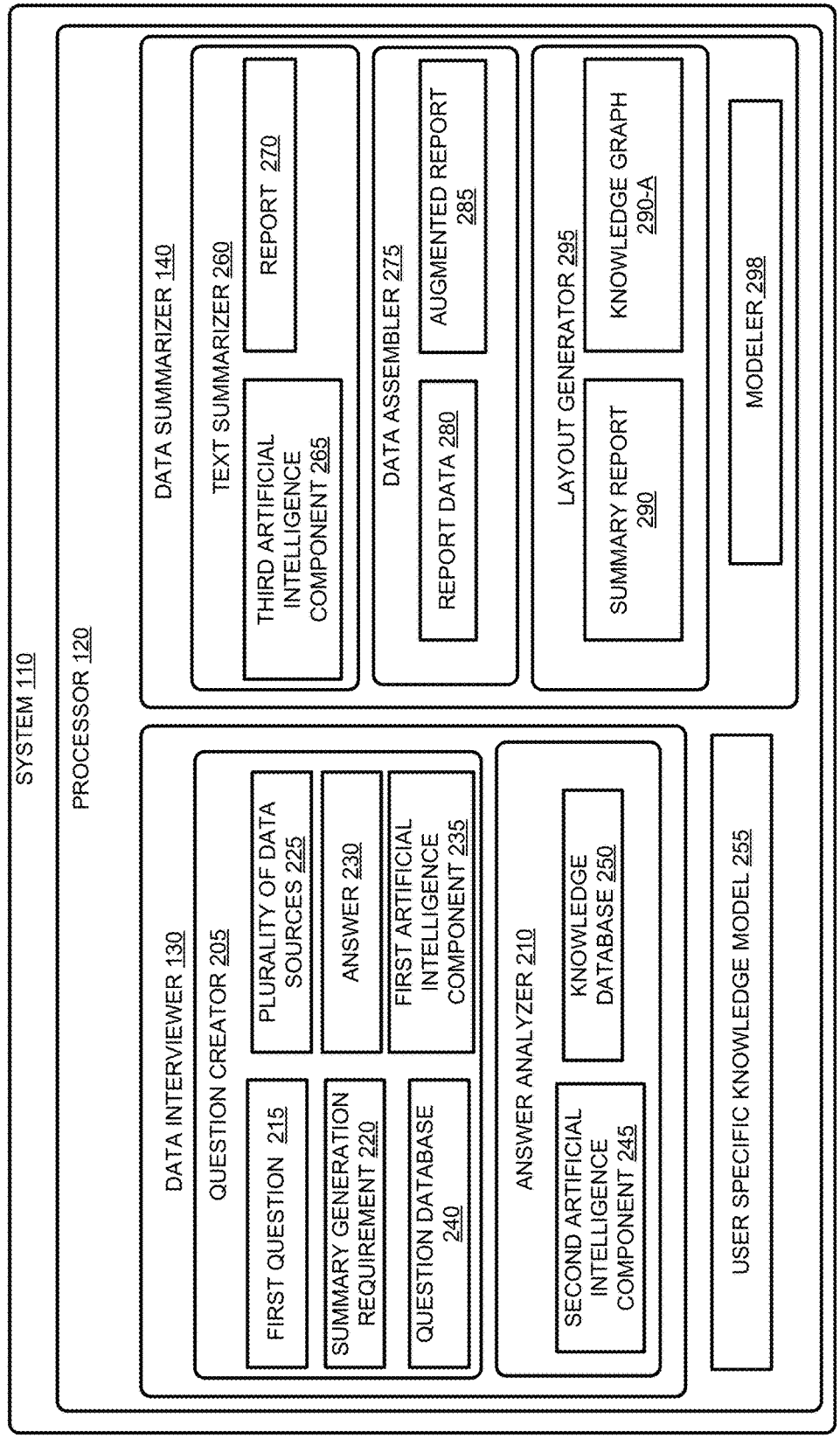
FIG. 2 illustrates various components of the system for intelligent communication management for content summarization, according to an example embodiment of the present disclosure.

FIG. 2 illustrates various components of the system 110 for intelligent communication management for content summarization, according to an example embodiment of the present disclosure. As mentioned above, the system 110 may include a processor 120, a data interviewer 130, and a data summarizer 140. The processor 120 may be coupled to the data interviewer 130 and the data summarizer 140. The operational aspects of the system 110 have been described in detail by way of FIG. 3 later in this document and only components of the system 110 are mentioned by way of FIG. 2.

In accordance with an exemplary embodiment of the present disclosure, the data interviewer 130 may be configured to execute the data collection stage mentioned above. In an example, the data interviewer 130 may further include a question creator 205 and an answer analyzer 210. The question creator 205 may generate a first question 215 for a user. The first question 215 may be associated with a summary generation requirement 220 sent to the system 110 by the user. In accordance with various embodiments of the present disclosure, the summary generation requirement 220 may include creating a story related to an event. In an example, the summary generation requirement 220 may refer to creating a summary for a meeting, a conference, a workshop, a multimedia content conglomerate and the like. In an example, the summary generation requirement 220 may include the addition of multimedia content for augmentation of a story created for a user. In an example, the summary generation requirement 220 may include the addition of the multimedia content to a story received as input from a user. For the sake of brevity and technical clarity, only embodiments of the summary generation requirement 220 may be presented herein, however, it should be clear to a person skilled in the art that the system 110 may be configurable to process various summary generation requirements 220 not mentioned herein. The first question 215 may be created by the data interviewer 130 to process the summary generation requirement 220. For example, the summary generation requirement 220 may include obtaining input from user-related hobbies, and other user information about a user. The first question 215 may be created by the data interviewer 130 to be for example, "What do you have for hobbies?"

The question creator 205 may receive question data from a plurality of data sources 225. In an example, the plurality of data sources 225 further comprise at least one of a combination of different content forms such as text, audio, an image, an animation, a video, and interactive content. The plurality of data sources 225 may include various databases across the Internet. The plurality of data sources 225 may include an internal database maintained by an organization or user that may be using the system 110. The question data may be associated with the first question 215 generated for the user by the system 110. The question data may be the text references from where the first question 215 may be created (explained further by way of subsequent Figs.). The question creator 205 may obtain an answer 230 for the first question 215 from the user. The answer 230 may be received from a user. The answer 230 may include information that a user may provide to the data interviewer 130 to answer the first question 215. In an example, the answer 230 obtained from the user may include an audio input. In accordance with various embodiments of the present disclosure, the data interviewer 130 may record an answer provided by a user and process the same. The data interviewer 130 may request a user to answer in multiple audio data fragments for enabling a user to provide lengthy audio inputs. The data interviewer 130 may process the multiple audio data fragments to compile the answer 230. The data interviewer 130 may validate if the user has finished providing the audio input. The data interviewer 130 may continue recording until a user may finish providing the audio input. For example, the first question 215 may be "What do you have for hobbies?". The answer 230 may be for example, "I love music. I go to classical music concerts often. I used to play the piano all the time too, it was my main activity during my retirement. I played in a lot of not professional representations. My best friend was a violinist and we practiced together all the time even when there was no concert planned. He came to my home because you can't move the piano easily. I had to take a retirement from concerts though it was too hard for my health. I was spending a lot of time traveling to rehearsals and working on pieces. I gave my last representation for 2 years before I really stopped. I still play but not as often just for fun. Practicing made me play every day, but I don't need to anymore. I still watch practices to see my younger friends."

Further, the question creator 205 may implement a first artificial intelligence component 235 to sort the question data and the obtained answer 230 into a plurality of data domains. In accordance with various embodiments of the present disclosure, the first artificial intelligence component 235 may include an intent recognition based algorithm such as a word representation in vector space like word2vec™ algorithm coupled with a Naive Bayesian™ algorithm. The first artificial intelligence component 235 may include an intent classifier such as Long Short-Term Memory (LSTM) model and a named-entity recognizer. The question creator 205 may analyze the plurality of data domains to generate a question database 240. The question database 240 may be updated based on a modification in a domain from the plurality of data domains.

The first artificial intelligence component 235 may be one of a data extractor, a data classifier, a data associator, a data comparer, a relationship extractor, and a dependency parser and the like. The question creator 205 may implement the first artificial intelligence component 235 to process the first question 215 and the answer 230. For example, the first question 215 may be "What do you have for hobbies?", and the answer 230 may be "I love music. I go to classical music concerts often. I used to play the piano all the time too, it was my main activity during my retirement. I played in a lot of not professional representations. My best friend was a violinist and we practiced together all the time even when there was no concert planned. He came to my home because you can't move the piano easily. I had to take a retirement from concerts though it was too hard for my health. I was spending a lot of time traveling to rehearsals and working on pieces. I gave my last representation for 2 years before I really stopped. I still play but not as often just for fun. Practicing made me play every day, but I don't need to anymore. I still watch practices to see my younger friends". The first artificial intelligence component 235 may process the answer 230 using an intent recognition based algorithm such as a word representation in vector space like word2vec™ algorithm coupled with a Naive Bayesian™ algorithm to identify all the words from the answer 230. The question creator 205 may update the first question 215 into the question database 240. The question creator 205 may include the words from the first question 215 and the answer 230 to generate the plurality of data domains. The words in the first question 215 and the answer 230 may be identified by implementation of the first artificial intelligence component 235. For example, the plurality of data domains may include words such as "What", "do", "you", "have", "for", "hobbies?", "I", "love", "music.", "I", "go", "to", "classical", "music", "concerts", "often.", "I", "used", "to", "play", "the", "piano", "all", "the", "time", "too,", "it", "was", "my", "main", "activity", "during", "my", "retirement.", "I", "played", "in", "a", "lot", "of", "not", "professional", "representations.", "My", "best", "friend", "was", "a", "violinist", "and", "we", "practiced", "together", "all", "the", "time", "even", "when", "there", "was", "no", "concert", "planned.", "He", "came", "to", "my", "home", "because", "you", "can't", "move", "the", "piano", "easily.", "I", "had", "to", "take", "a", "retirement", "from", "concerts", "though", "it", "was", "too", "hard", "for", "my", "health.", "I", "was", "spending", "a", "lot", "of", "time", "traveling", "to", "rehearsals", "and", "working", "on", "pieces.", "I", "gave", "my", "last", "representation", "for", "2", "years", "before", "I", "really", "stopped.", "I", "still", "play", "but", "not", "as", "often", "just", "for", "fun.", "Practicing", "made", "me", "play", "every", "day", "but", "I", "don't", "need", "to", "anymore.", "I", "still", "watch", "practices", "to", "see", "my", "younger", "friends". The plurality of data domains may include all the words from the first question 215 and the answer 230.

In accordance with various embodiments of the present disclosure, the data interviewer 130 may further include an answer analyzer 210. The answer analyzer 210 may implement a second artificial intelligence component 245 to extract information, from each obtained answer 230. The second artificial intelligence component 245 may analyze the answer 230 by deploying various tools and techniques for keyword extraction and classification, performing a sentiment analysis on the extracted keywords, and tag the relevant keywords with an appropriate sentiment. For example, the second artificial intelligence component 245 may process the answer 230 using an intent recognition based algorithm such as a word representation in vector space like word2vec™ algorithm coupled with a Naive Bayesian™ algorithm to identify words such for example, "music", "play" and "piano" from the answer 230. The word "music" may be tagged as "music", the word "play" may be tagged as a "hobby", and the word "piano" may be tagged as "piano". The second artificial intelligence component 245 may perform a word sentiment analysis on the aforementioned words and mark them with words representing proper sentiment such for example, "positive", "enthusiastic". The second artificial intelligence component 245 may tag the words from the answer 230 based on the intent recognition and the sentiment analysis, such for example, the word "hobby" and the word "piano" may be used to tag the answer 230 for the first question 215.

Further, the question creator 205 may generate a new question for the user. In an example, the new question may be associated with the obtained answer 230 for the first question 215 and the question database 240. The new question may be a question identified by the system 110 as relevant to the obtained answer 230 from the question database 240. In an example, the new question may be a question generated according to a user response for the first question 215. The new question may be generated based on a result of the implementation of the second artificial intelligence component 245 on the answer 230 for the first question 215. For example, the new question may be generated based on the tags "Hobby", and "Piano". Additionally, the new question may be generated based on the sentiment such for example, "positive", "enthusiastic".

In operation, the question creator 205 will generate the first question 215 and obtain an answer 230 for the same.

The question creator 205 may then generate the new question according to the obtained for the first question 215. For example, as mentioned above, the first question 215 may be "What do you have for hobbies?", and the answer 230 may be "I love music. I go to classical music concerts often. I used to play the piano all the time too, it was my main activity during my retirement. I played in a lot of not professional representations. My best friend was a violinist and we practiced together all the time even when there was no concert planned. He came to my home because you can't move the piano easily. I had to take a retirement from concerts though it was too hard for my health. I was spending a lot of time traveling to rehearsals and working on pieces. I gave my last representation for 2 years before I really stopped. I still play but not as often just for fun. Practicing made me play every day, but I don't need to anymore. I still watch practices to see my younger friends".

The question creator 205 may now generate the new question to be for example, "How long have you played or wished to play the piano?" The system 110 may obtain answer 230 for the new question. For example, the answer 230 for the new question may be "I learned to play when I was a child, my parents had a piano. I wasn't really good or invested at that time. I stopped playing when I was a teenager because I was too busy with studies. Music was still a big part of my life, but I preferred to listen to music rather than play it. I didn't get back into piano until my forties. I worked less and had more time to give to music. My musician friends encouraged me to. After my retirement, I got into it much more seriously. I got good enough that people wanted me for concerts!".

The question creator 205 may generate a question loop, wherein each question would be treated as the first question 215 and the new question alternatively. For example, the new question may be treated as a preceding question for further generation of another question, thereby equating the new question with the first question 215 described above. The first artificial intelligence component 235 and the second artificial intelligence component 245 may be deployed simultaneously to generate the new question and analyze the answer 230 for the new question to generate the question loop.

In an example, the first question 215 may be a subsequent question generated in response to the preceding question. For example, the question creator 205 may process generate a subsequent question such for example, "What advice would you give to your 16-year-old self?" based on the answer 230 to a previous question. The answer 230 to the previous question may be "I learned to play when I was a child, my parents had a piano. I wasn't really good or invested at that time. I stopped playing when I was a teenager because I was too busy with studies. Music was still a big part of my life, but I preferred to listen to music rather than play it. I didn't get back into piano until my forties. I worked less and had more time to give to music. My musician friends encouraged me to. After my retirement, I got into it much more seriously. I got good enough that people wanted me for concerts!" The question creator 205 may implement the first artificial intelligence component 235 to identify words or phrases such for example, "teenager", "wasn't really good or invested at that time", "After my retirement I got into it much more seriously", and the like. The question creator 205 may generate the subsequent question based on the words or phrases from the answer 230 for a previous question. In an example, the question creator 205 may generate the subsequent question based on the words or phrases from the answer 230 for any previous questions from the question loop. The question creator 205 may generate the subsequent question based on the words or phrases from any of the answers 230 for any of the previous questions from the question loop. The question creator 205 may generate the subsequent question based on the words or phrases from answers 230 from multiple previous questions from the question loop.

As mentioned above, the first artificial intelligence component 235 and the second artificial intelligence component 245 may be deployed simultaneously to generate the new question and analyze the answer 230 for the new question. In accordance with various embodiments of the present disclosure, the second artificial intelligence component 245 may include a natural language understanding algorithm in addition to an intent recognizer such as an algorithm such as a word representation in vector space like word2vec™ coupled with a Naive Bayesian™ algorithm. The answer analyzer 210 may generate a knowledge database 250 from the information extracted from each obtained answer 230. The knowledge database 250 may be generated using a machine learning data classifier such as a quadratic classifier. The answer analyzer 210 may associate the summary generation requirement 220 of the user with the knowledge database 250 to enrich a user-specific knowledge model 255. The user-specific knowledge model 255 may include information regarding a particular user that may be stored in the system 110. The user-specific knowledge model 255 may be deployed to process various summary generation requirements 220 associated with the same user. The user-specific knowledge model 255 may be generated specific to an organization, a product category, a user, a summary generation requirement, etc. The user-specific knowledge model 255 for the summary generation requirement 220 may be stored for further use. The operational aspects of data interviewer 130 have been described in detail by way of FIG. 5 later in this disclosure document. In an example, the first artificial intelligent component 235 may further obtain input from the user-specific knowledge model 255 to generate an update in the question database 240. The user-specific knowledge model 255 may include information pertaining to a user and the question database 240 may be updated based on the same by the implementation of the first artificial intelligent component 235.

As mentioned above the system 110 may include the data summarizer 140. In an example, the data summarizer 140 may be configured to execute a data summarization and data visualization for processing the summary generation requirement. The data summarizer 140 may further include a text summarizer 260, a data assembler 275, a layout generator 295, and a modeler 298. In an example, the text summarizer 260 may obtain the user-specific knowledge model 255 from the answer analyzer 210.

The text summarizer 260 may summarize the data present in the knowledge database 250. Further, the text summarizer 260 may implement a third artificial intelligence component 265 to generate a report 270 from the user-specific knowledge model 255. The third artificial intelligence component 265 may include using natural language generation techniques such as a recurrent neural network-based language model to generate the report 270. The third artificial intelligence component 265 may implement various tools and techniques for abstractive summarization (explained in detail by way of FIG. 5) and tools and techniques for extractive summarization (explained in detail by way of FIG. 5). The report 270 may be associated with the summary generation requirement 220 of the user. The data assembler 275 may obtain report data 280 from the plurality of data sources 225. The report data 280 may be associated with the report 270 generated from the user-specific knowledge model 255. The report data 280 may include additional content associated with the report 270. For example, the report data 280 may include relevant images and videos associated with the report 270 obtained from the plurality of data sources 225. The report data may include multimedia content relevant to the contents of the report 270.

Further, the data assembler 275 may map the report data 280 with the report generated from the user-specific knowledge model 255 to generate an augmented report 285. As mentioned above, the report data 280 may be associated with the report 270. For example, the report data 280 may include images of a piano, or images of a user playing piano. The data assembler 275 may map the images of the piano, or images of a user playing piano with relevant sections of the report 270 and insert the aforementioned images therein to generate the augmented report 285. The augmented report 285 may indicate an automatic enrichment of the report 270 generated from the user-specific knowledge model 255. In an example, the automatic enrichment may be accomplished through one or more additional resources. In an example, the additional sources may be identified by the system 110 as being related to the report 270 generated from the user-specific knowledge model 255. For example, the additional sources may include information from a social media account of the user from whom the user data may have been collected thus far. For example, the data assembler 275 may collect images or videos of the user associated with the summary generation requirement 220 from a social media account of the user. In an example, the additional source may be a multimedia resource such as a picture that may be related to the user data, and the report data 280 collected thus far.

The data summarizer 140 may further include the layout generator 295. The layout generator 295 may obtain the augmented report 285 from the data assembler 275. The layout generator 295 may modify the augmented report 285 to generate a summary report 290. The summary report 290 may be the augmented report 285 arranged a specific layout that may be created by the layout generator 295. In an example, the layout generator 295 may obtain user input for the generation of the summary report from the augmented report 285. In an example, the user input may include input relates to a choice of layout that may be presented to a user. The summary report 290 may be associated with the summary generation requirement 220 of the user. In an example, the data summarizer 140 may provide the summary report 290 to the user as a content form comprising at least one of a text, audio, an image, an animation, a video, and an interactive content.

The modeler 298 may initiate a summary generation to resolve the summary generation requirement 220 based on the summary report 290. In an example, the data summarizer 140 may further obtain a user feedback from the user to generate a modification in the summary report 290. In accordance with various embodiments of the present disclosure, the summary generation may include the generation of a feedback loop for generating modifications in the summary report 290 till the user of the system 110 may deem the report satisfactory. In an example, the system 110 may be configured to generate a feedback loop for generating modifications in the summary report 290 till the user of the system 110 may deem the report satisfactory. In accordance with an embodiment of the present disclosure, the layout generator 295 may create the feedback loop for generating modifications in the summary report 290 to be based on input from the user. In accordance with an embodiment of the present disclosure, the layout generator 295 may create the feedback loop for automatically generating modifications in the summary report 290. In accordance with an embodiment of the present disclosure, the feedback loop may be configurable to obtain input from the user for generating modifications in the summary report 290 as well as configurable to generate modifications in the summary report 290 automatically. The operational aspects of data summarizer 140 have been described in detail by way of FIG. 5 later in this document.

In an example, the data summarizer 140 may generate a knowledge graph 290-A for each of the user-specific knowledge models 255. The knowledge graph 290-A may comprise visualization of the user-specific knowledge model 255. The knowledge graph 290-A may be an aspect of the visualization stage mentioned above. In an example, the knowledge graph 290-A may be a part of the summary report 290. The knowledge graph 290-A has been described in detail by way of FIG. 6 later in this document.

In accordance with various embodiments of the present disclosure, the data summarizer 140 may obtain user input to generate the summary report 290. In an example, the data summarizer 140 may update the summary report 290 based on an update in the knowledge database 250. Furthermore, the data summarizer 140 may initiate a summary generation to resolve the summary generation requirement 220, based on the summary report 290. Additionally, the data summarizer 140 may be configurable to generate the summary report 290 automatically based on the user data and/or knowledge database 250 to resolve the summary generation requirement 220. In another embodiment of the present disclosure, the data summarizer 140 may be configurable to obtain input from the user for the automatic generation of the summary report 290 to resolve the summary generation requirement 220.

In an example embodiment, the system 110 may use to generate a summary from a given input in an automated manner. The system 110 may include the data interviewer 130, and the data summarizer 140. The system 110 may receive the summary generation requirement 220. The data interviewer may generate the first question 215 for a user. The first question 215 may be associated with the summary generation requirement 220. The first artificial intelligence component 235 and the second artificial intelligence component 245 may be implemented on the first question 215 and the answer 230 for the first question 215. A new question may be generated by the implementation of the first artificial intelligence component 235 and the second artificial intelligence component 245 based on the answer 230 for the first question 215. The system 110 may further generate a subsequent question based on the answer 230 for the new question and/or the answer 230 for the first question 215. The system 110 may generate a question loop (explained above) and create the knowledge database 250 based on answers 230 for the questions from the question loop. The data interviewer 130 may create the user-specific knowledge model 255 for every user of the system 110 from the knowledge database 255.

The data summarizer 140 may further include a text summarizer 260, a data assembler 275, a layout generator 295, and a modeler 298. In an example, the text summarizer 260 may obtain the user-specific knowledge model 255 from the answer analyzer 210. The text summarizer 260 may summarize the data present in the user-specific knowledge model 255. Further, the text summarizer 260 may implement the third artificial intelligence component 265 to generate the report 270 from the user-specific knowledge model 255. The data summarizer 140 may obtain report data 280 from the plurality of sources 225 and create the augmented report 285. The augmented report 285 may indicate an automatic enrichment of the report 270. The layout generator 295 may obtain the augmented report 285 from the data assembler 275. The layout generator 295 may modify the augmented report 285 to generate the summary report 290. The summary report 290 may be the augmented report 285 arranged a specific layout that may be created by the layout generator 295. The modeler 298 may initiate a summary generation to resolve the summary generation requirement 220 based on the summary report 290.

In accordance with an embodiment of the present disclosure, the first artificial intelligence component 235, the second artificial intelligence component 245, and the third artificial intelligence component 265 may include recognizing a pattern, for example, hypothetical questions and logical flows to obtain an inference to the hypothetical questions.

Figure 3:
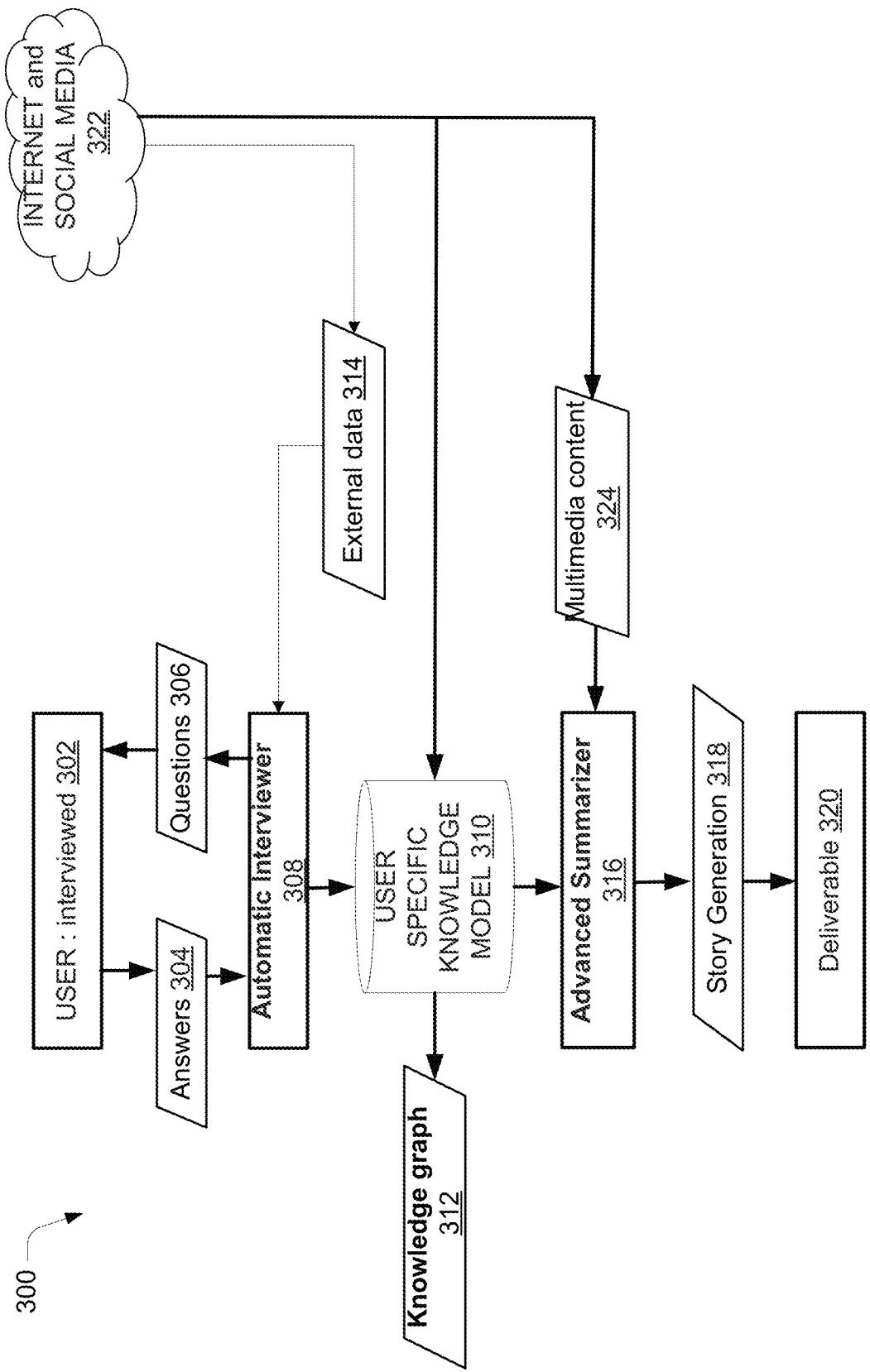
FIG. 3 illustrates a process flowchart for operational aspects of the system for intelligent communication management for content summarization, according to an example embodiment of the present disclosure.

FIG. 3 illustrates a process flowchart 300 presented as an example of the operational aspects of the system for intelligent communication management for content summarization, according to an example embodiment of the present disclosure. Any of the components described by FIG. 1 and FIG. 2 may be used for implementing stages mentioned herein by way of the process flowchart 300. For sake of brevity and technical clarity, the process flowchart 300 may be referred to as "system 300" for the purpose of this disclosure document. It should be understood that any of the components described for the system 110 by way of FIG. 1 and FIG. 2 might be deployed for the system 300. The arrangement of each of the components of the system 300 may be similar to the system 110. The system 300 may be configured to implement the stages of data collection, data summarization, and visualization, which have been mentioned above.

The process of intelligent communication management for content summarization as illustrated by the system 300 may include a user 302. The user 302 may be interviewed by the system 300. The system 300 may include an automatic interviewer 308. The automatic interviewer 308 may be the same as the data interviewer 130 explained above, by way of FIG. 1 and FIG. 2. The automatic interviewer 308 may generate a question 306 for the user 302. The user may provide an answer 304 for the question 302. In an example, the question 306 and the answer 304 may be stored in the automatic interviewer 308 for future use. The automatic interviewer 308 may generate a new question as to the question 306 in response to the answer 304 received from the user. In an example, the question 306 may be a set of questions generated by the automatic interviewer 308 for a specific user. In an example, the answer 304 may be a set of answers received by the automatic interviewer 308 corresponding to the question 306. The automatic interviewer 308 may include a set of pre-defined questions, which may be used for a specific set of answers similar to the answer 304. The automatic interviewer 308 may also receive an input from an external data source 314. In an example, the external data source may be information collected by way of the Internet, for example, using a social media medium 322. The automatic interviewer 308 is described in detail by way of FIG. 4. Further, the system 300 may include a user-specific knowledge model 310. The user-specific knowledge model 310 may receive all the information comprising information collected by way of the answer 304 and the question 306. The user-specific knowledge model 310 may also receive an input from an external data source such as information collected by way of the Internet, for example, using the social media medium 322. In an example, social media 322 may include interactive computer-mediated technologies that facilitate the creation and sharing of information, ideas, career interests and other forms of expression via virtual communities and networks.

In an example, the system 300 may generate the user-specific knowledge model 310 for every user similar to the user 302. The user-specific knowledge model 310 may use the information assimilated from the automatic interviewer 308, and the social media 322 to facilitate the formation of a knowledge graph 312 (explained in detail by way of FIG. 6). In an example, the knowledge graph 312 may form a part of the visualization stage mentioned above.

The system 300 may further include an advance summarizer 316 (explained in detail by way of FIG. 5). The advance summarizer 316 may receive information stored in the user-specific knowledge model 310. The information may include information assimilated from the automatic interviewer 308, and the social media 322. Further, the advance summarizer 316 may receive information from multimedia content 324. In an example, the multimedia content 324 may include content that may use a combination of different content forms h as text, audio, images, animations, video, and interactive content. The multimedia content 324 may include content from the Internet or the social media 322 that may be related to the information assimilated through the user-specific knowledge model 310.

Further, the advance summarizer 316 may use the multimedia content 324 and the information from the user-specific knowledge model 310 for a story generation 318. The story generation 318 may constitute the visualization stage as mentioned above. In an example, the system 300 may present the story generated by the story generation 318 to the user 302. The user 302 may require a modification to be made in the story generated by the story generation 318. The system 300 may generate the modification as required by the user and may present a story generated by the story generation 318 to the user 302. The loop of story generation and modification required by the user 302 may continue until the user 302 may deem the story generated by the story generation 318 as satisfactory. The system 110 may generate a deliverable 320 from the story generated by the story generation 318 after the user 302 may have deemed the story generated by the story generation 318 as satisfactory. In an example, the advance summarizer 316 may use the multimedia content 324 for the enrichment of the information assimilated into the user-specific knowledge model 310 through the automatic interviewer 308.

Figure 4:
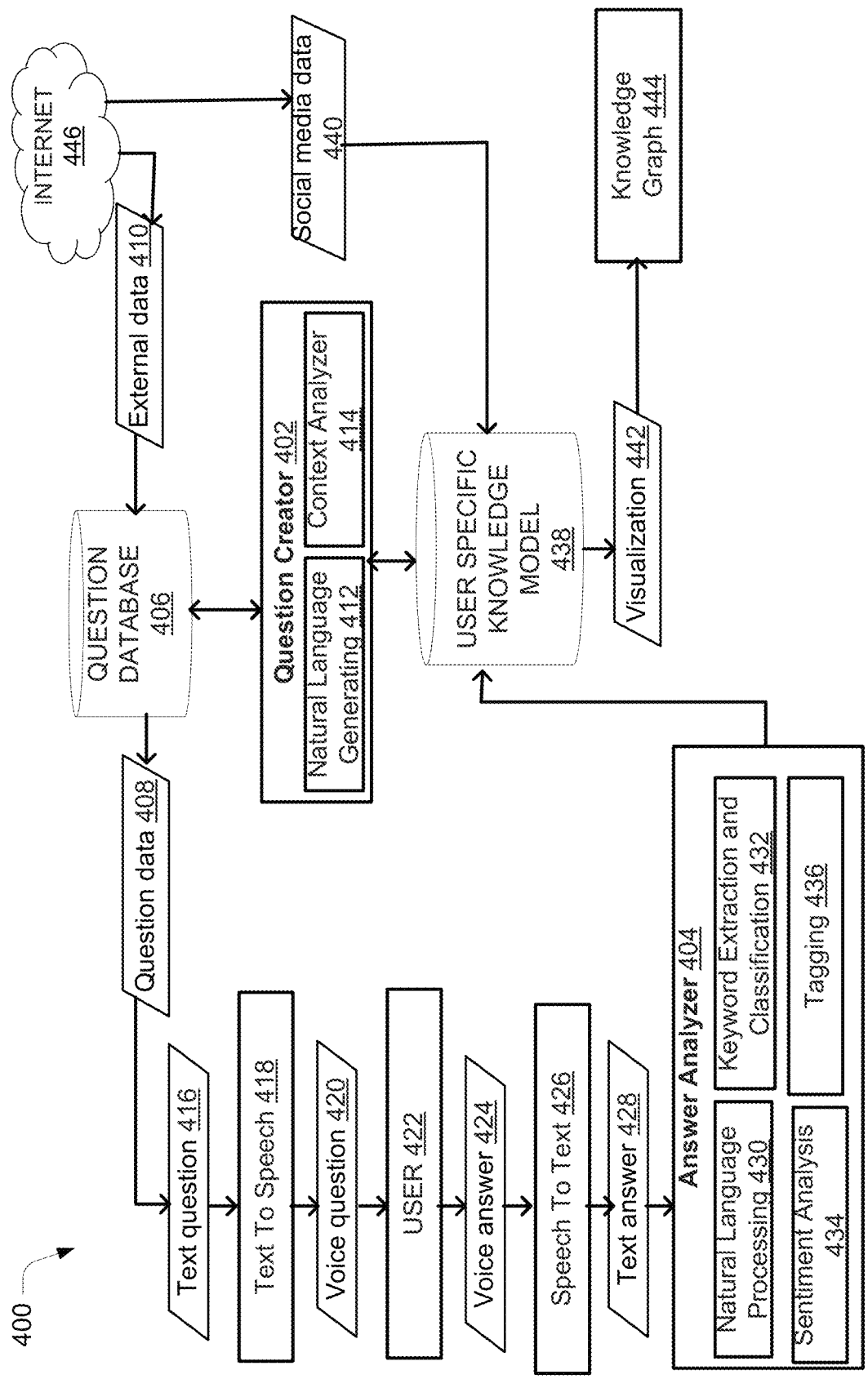
FIG. 4 illustrates a process flowchart for proactive sensing of interview questions, according to an example embodiment of the present disclosure.

FIG. 4 illustrates a process flowchart 400 for proactive sensing on interview questions, according to an example embodiment of the present disclosure. Any of the components described by FIG. 1 and FIG. 2 may be used for implementing stages mentioned herein by way of the process flowchart 400. For the sake of brevity and technical clarity, the process flowchart 400 may be referred to as "system 400" for the purpose of this document. It should be understood that any of the components described for the system 110 by way of FIG. 1 and FIG. 2 might be deployed for the system 400. The arrangement of each of the components of the system 400 may be similar to the system 110. In an example, the system 400 may be a data interviewer similar to the data interviewer 130.

The system 400 may include a question creator 402, an answer analyzer 404, and a user-specific knowledge model 438. The question creator 402 may create a question such as the first question 215, the new question, the subsequent question, and other questions from the question loop, as described above using natural language generation such as a recurrent neural network-based language model. The answer analyzer 404 may analyze answers such as answer 230 using a natural language understanding algorithm in addition to an intent recognizer such as an algorithm such as a word representation in vector space like word2vec™ coupled with a Naive Bayesian™ algorithm. The question creator 402 and the answer analyzer 404 may be coupled to the user-specific knowledge model 438. In an example, the question creator 402 may be similar to the question creator 205. In an example, the answer analyzer 404 may be similar to the answer analyzer 210. The question creator 402 may include a natural language generating component 412, and a context analyzer 414. Any of the natural language generating component 412, and the context analyzer 414 may be implemented by the first artificial intelligence component 235. In an example, the question creator may create questions for the user 422 based on a previous answer provided by the user, the system 400 will detect the keyword and the topic of each of them, thereby allowing the system 400 to produce automatically new questions in the flow of the interview or choose from a new branch of a question tree. For example, if a first question for the user 422 may be "Where was your last holidays?" and an answer provided by the user 422 may be "I spent 2 weeks in Croatia last year." The natural language generating component 412, and the context analyzer 414 through the first artificial intelligence component 235 may break the answer provided by a duration, a location, and a time dimension or date and the question creator 402 would generate new questions therefrom. For example, the aforementioned duration, date and location may lead to questions like "What did you prefer in Croatia?", "How many times have you been in Croatia?", and "Do you plan to travel again to Croatia?". The question creator 402 would generate further questions based on an answer to any one of the questions mentioned above.

The question creator 402 may create questions for a user 422 of the system 400 for processing a summary generation requirement, which may be sent by the user to the system 400. The question creator 402 may be coupled to a question database 406 and the user-specific knowledge model 438. The question creator 402 may interact with the user-specific knowledge model 438 for storing information on all questions created for the user 422. In an example, the question creator 402 may create questions for the user 422 from a set of questions that may be stored in the user-specific knowledge model 438 and may be relevant for a user different from the user 422. In an example, the question creator 402 may create more questions for the user 422 using information assimilated in the user-specific knowledge model 438 through the answer analyzer 404, the question creator 402, and a social media component 440. The social media component may interact with an Internet source 446.

The question database 406 may receive input from an external data source 410. The external data source 410 may be configured to interact with a plurality of sources including the Internet source 446. The external data source 410 may be similar to the external data source 314. The question database 406 may generate a question of data 408 based on the information assimilated through the external data source 410 and the question creator 402. In an example, the system 400 may present the question data 408 to the user 422 in the form of a text question 416. In an example, the system 400 may include a text to speech conversion 418. The text to speech conversion 418 may be configured to convert the text question 416 into a voice question 420. The system 400 may present the question data 408 to the user 422 in the form of the voice question 420. In accordance with an embodiment of the present disclosure, the user 422 may provide a voice answer 424 for the text question 416 or the voice question 420. The system 400 may include a speech to text conversion 426. The speech to text conversion 426 may be configured to convert the voice answer 424 into a text answer 428.

Further, the answer analyzer 404 may receive the text answer 428. In accordance with an embodiment of the present disclosure, the answer analyzer 404 may further include a natural language processing component 430, a keyword extraction and classification component 432, a sentiment analysis 434, and a tagging 436. The results from the answer analyzer 404 may be stored in the user-specific knowledge model 438. In an example, the results from the answer analyzer 404 for the text answer 428 may be used by the question creator 402 for creating a new question for the user 422. In operation, the implementation of the system 400 may be a tree of questions, with branches only being accessible if triggered by the content of the text answer 424 received from the user 422 (a detailed example is presented hereunder).

As mentioned above, the answer analyzer 404 may include the natural language processing component 430, the keyword extraction and classification component 432, the sentiment analysis 434, and the tagging 436. Any of the natural language processing component 430, the keyword extraction and classification component 432, the sentiment analysis 434, and the tagging 436 and may implemented by the second artificial intelligence component 245. The natural language processing component 430 may refer to natural language processing (NLP), which may be the ability of a computer program to understand human language as it is spoken. NLP is a component of artificial intelligence. In an example, the NLP component 430 may be used to detect if the user 422 has presented the voice answer 424 to the system 400 or the user 422 has presented a service command to the system 400.

In an example, the sentiment analysis 434 based on analysis of the text answer 428 may be executed through three main methods. The methods may be a machine learning approach, a lexicon-based approach, and a rule-based approach. The machine learning approach may include training the system 400 in machine learning algorithms with a dataset where existing sentiment may have been tagged manually. The lexicon-based approach may include calculating the sentiment based on the "polarity" of each word of a sentence. The rule-based approach may include checking opinion words in a corpus and classify the opinion words based on the number of positive and negative words. The rule-based approach involves different rules for classification such as dictionary polarity, negation words, booster words, etc. Further, the sentiment analysis 434 may process the audio to extract a tone of voice from the voice answer 424 for adding an additional layer to the sentiment analysis 434.

In an example, each text answer 428 provided by the user 422 may be processed through several layers including any of the natural language processing component 430, the keyword extraction and classification component 432, the sentiment analysis 434, and the tagging 436 for extracting key information. In an example, the keyword extraction and classification component 432 may be used to extract and classify each keyword identified from the text answer 428. The tagging 436 may be used to tag each text answer 428 for structuring a knowledge graph. The knowledge graph may be similar to the knowledge graph 312 (explained in detail by FIG. 6). The sentiment analysis 434 may be used to detect a sentiment of the user 422 on the voice answer 424 or the text answer 428. The voice answer 424 or the text answer 428 may form input for the answer analyzer 404. The information generated from any of the natural language processing component 430, the keyword extraction and classification component 432, the sentiment analysis 434, and the tagging 436 may be linked with the text answer 428 and the voice question 420. The information may be stored in the user-specific knowledge model 438. The information may be used by the question creator 402 through the user-specific knowledge model 438 for generating more questions for the user 422. In an example, the user-specific knowledge model 438 may facilitate in generating visualization 442 for the information provided by the answer analyzer 404 for the user 422. The visualization 442 may assist with the generation of a knowledge graph 444.

An operational example of the working of the system 400 or the data interviewer 130 is presented hereunder. In an example, the system 400 may be configured so that the user-specific knowledge model 438 may retrieve information about the age of the user 422 through the social media data 440 and the Internet source 446. The question database 406 may retrieve a date, which may be a current date from the external data source 410 and the Internet source 446. The question creator 402 may retrieve the age of the user 422 from the user-specific knowledge model 438 and the current date from the question database 406. The question creator 402 may implement the first artificial intelligence component 235 and use the natural language generating component 412, and the context analyzer 414 to generate a first question for the user 422. For example, the first question may be "What are your hobbies?". The first question may be a part of the question data 408. As mentioned above, the system 400 may present the question data 408 to the user 422 in the form of the text question 416. In an example, the system 400 may include the text to speech conversion 418. The text to speech conversion 418 may be configured to convert the text question 416 into the voice question 420. The system 400 may present the question data 408 to the user 422 in the form of the voice question 420. In accordance with an embodiment of the present disclosure, the user 422 may provide the voice answer 424 for the text question 416 or the voice question 420. For example, the user 422 may provide an answer "I love music! I used to play the piano" to the first question mentioned above. The system 400 may include the speech to text conversion 426. The speech to text conversion 426 may be configured to convert the voice answer 424 into the text answer 428.

The answer analyzer 404 may receive the text answer 428. In accordance with an embodiment of the present disclosure, the answer analyzer 404 may further implement the second artificial intelligence component 245 and execute any of the natural language processing component 430, the keyword extraction and classification component 432, the sentiment analysis 434, and the tagging 436. The sentiment analysis 434 may, for example, recognize an "enthusiastic" or a "positive" in the voice answer 424 or the text answer 428. The tagging component 436 may generate a tag "HOBBY: PIANO" for the user 422. The keyword extraction and classification component 432 may extract a keyword set "music, play, and piano" from the voice answer 424 or the text answer 428. The information assimilated through the second artificial intelligence component 245 may be sent to the user-specific knowledge model 438. The question creator 402 may retrieve the information assimilated by the answer analyzer in response to the first question for the generation of a new set of questions for example, "questions related to the piano".

Figure 5A:
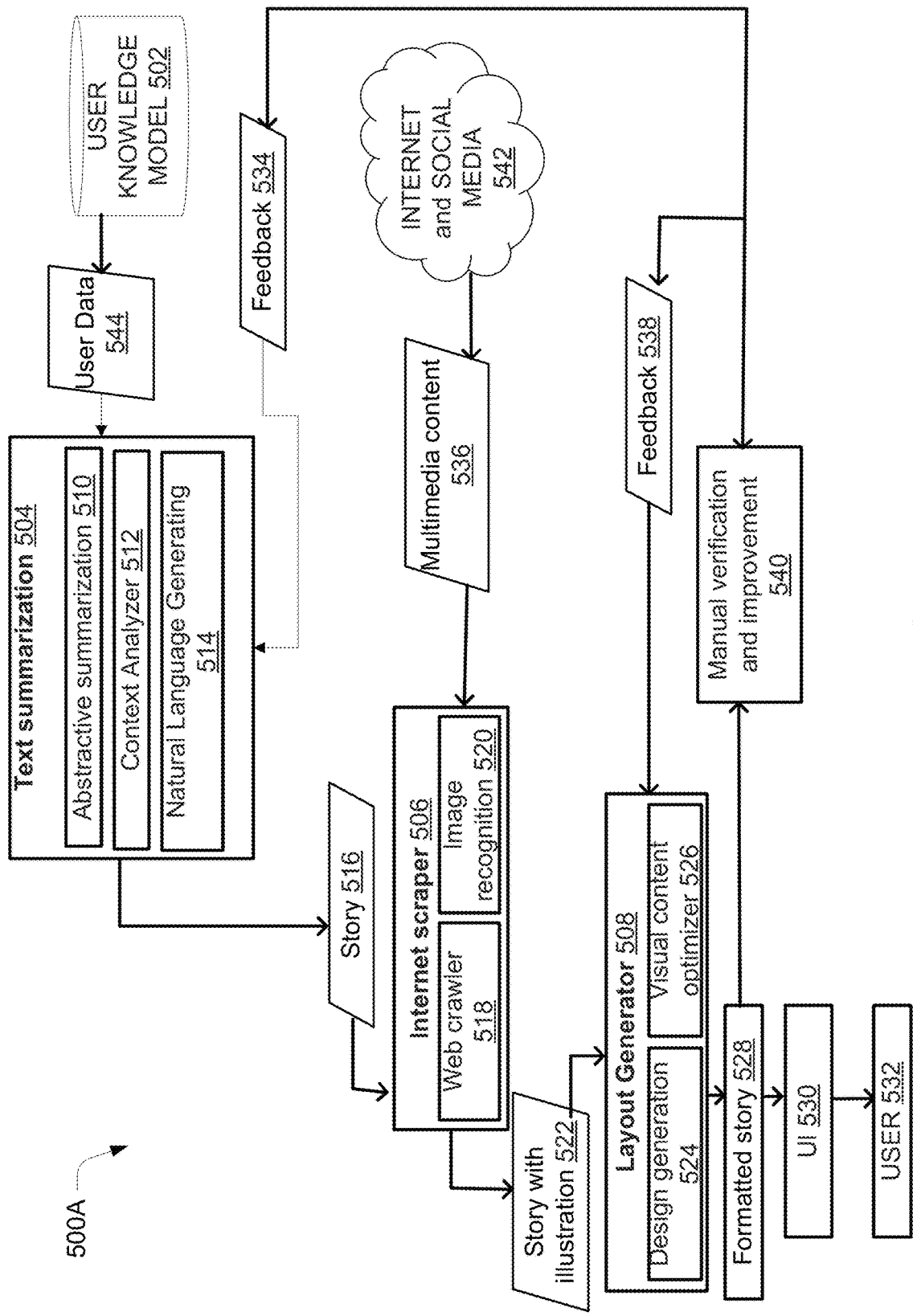
FIG. 5A illustrates a process flowchart for continuous summarization of digital content received from proactive sensing of interview questions, according to an example embodiment of the present disclosure.

FIG. 5A illustrates a process flowchart 500 for continuous summarization of digital content received from proactive sensing on interview questions, according to an example embodiment of the present disclosure. FIG. 5B illustrates a summarization created through the process flowchart 500. FIG. 5C illustrates a formatted story created through the process flowchart 500. FIGS. 5A, 5B, and 5C may be explained together with the sake of technical clarity. Any of the components described by FIG. 1 and FIG. 2 may be used for implementing stages mentioned herein by way of the process flowchart 500. For the sake of brevity and technical clarity, the process flowchart 500 may be referred to as "system 500" for the purpose of this document. It should be understood that any of the components described for the system 110 by way of FIG. 1 and FIG. 2 might be deployed for the system 500. The arrangement of each of the components of the system 500 may be similar to the system 110.

The system 500 may include a user knowledge database 502, a text summarizer 504, an Internet scraper 506, and a layout generator 508. The user knowledge database 502 may be similar to the user-specific knowledge model 438. For the sake of brevity and technical clarity, the term user-specific knowledge model 438 is being used herein. As mentioned above, the information assimilated through the second artificial intelligence component 245 may be sent to the user-specific knowledge model 438. This information may constitute a user data 544. In an example, the user data 544 may be a set of answers similar to the text answer 428, which have been processed by the answer analyzer 404 and stored in the user-specific knowledge model 438.

The text summarizer 504 may receive the user data 544. Further, the text summarizer 504 may include an abstract summarization component 510, a context analyzer 512, and a natural language generating component 514. The text summarizer may execute the third artificial intelligent component 265 for executing any of the abstract summarization component 510, the context analyzer 512, and the natural language generating component 514. The text summarizer 504 may deploy techniques such as a Latent Semantic Analysis Method for text summarization. The text summarizer 504 may be configured to summarize the user data 544 using an extractive summarization method, such as a Latent Semantic Analysis Method, and an abstractive summarization method, such as a Multimodal Semantic Model and a Tree-Based method. The extractive summarization method may include the most important sentences of a text are selected and put together to form a summary. The abstractive summarization method may create sentences by deploying the natural language generating component 514. While the present disclosure provides examples of the extractive summarization and the abstractive summarization, one of ordinary skill in the art will appreciate that the system 110 may implement the extractive summarization and the abstractive summarization in any other form as well.

In an example, the extractive summarization may include three steps, namely a first step of the construction of an intermediate representation of the input text of the user data 544, a second stage of scoring the sentences based on the intermediate representation, and a third step of selection of a summary comprising of a number of sentences. The first step may further include the use of a topic representation approach and an indicator representation approach. The topic representation approach may transform the user data 544 into an intermediate representation and interpret content discussed in the text. The techniques used for the interpretation may be of varying complexity, and may be divided into frequency-driven approaches, topic word approaches such as latent semantic analysis, a discourse-based method, and Bayesian topic models. For the sake of brevity and technical clarity, an explanation of these models is not presented herein; however, a person skilled in the art will recognize the aforementioned techniques and their respective entailments. The indicator representation approach may describe every sentence as a list of formal features of importance such as a sentence length, position in the document, having certain phrases, and the like. Examples of the indicator representation approach may include using a graph method, and a machine learning approach. Additionally, the machine learning approach may further include applying Naive Bayes, decision trees, support vector machines, Hidden Markov Models and Conditional Random Fields to obtain a true-to-life summary. For the sake of brevity and technical clarity, an explanation of these models is not presented herein; however, a person skilled in the art will recognize the aforementioned techniques and their respective entailments.

The second stage may be executed when the intermediate representation may be generated. In an example, an importance score is assigned to each sentence for scoring the sentences based on the intermediate representation. In the topic representation approach, the score of a sentence may represent a degree of detail for each sentence while explaining some of the most important topics of the text. In the indicator representation approach, the score may be computed by aggregating evidence from different weighted formal features identified by the first step. The third step may comprise the answer analyzer 404 to select a certain number of most important sentences to produce a summary. In an example, the answer analyzer 404 may deploy a greedy algorithm to select the important sentences. In another example, the answer analyzer 404 may deploy an approach for converting the selection of sentences into an optimization problem where a collection of sentences may be chosen, based on the degree of maximizing overall importance and coherency along with minimizing the redundancy.

In an example, the abstractive summarization may require a deeper analysis of the user data 544. These methods may have the ability to generate new sentences, which may improve the focus of a summary, reduce its redundancy and keep a good compression of the user data 544. For example, as mentioned above with reference to the example presented by way of FIG. 2 the abstractive summarization may produce a story from the answers 230 received from the first question 215, the new question, and the subsequent questions from the question loop. The summarization produced by deploying the abstractive summarization may be for example, "The advice I would give to 16-years-old would tell to stop worrying. My best friends came from meeting new people and doing new things. I love music I go to a concert I played the piano during my retirement. I practiced with my best friend a violinist. I learned to play as a child and stopped as I was a teenager. I didn't get back into the piano in my forties. I was encouraged by friends to go into it and wanted for concerts."

In an example, the extractive summarization may include deploying a structure-based approach. In an example, the extractive summarization may include deploying a semantic-based approach. In an example, the structure-based approach may encode most important information from a document through cognitive schemas such as templates, extraction rules and other structures such for example, a tree-based method, a template-based method, an ontology-based method, a lead and body phrase method, and a rule-based method. The tree-based method techniques may use a dependency tree to represent the text/contents of a document. Different algorithms may be used for content selection for summary generation, for example, a theme intersection algorithm or an algorithm that may use local alignment across a pair of parsed sentences. The technique may use either a language generator or an algorithm for the generation of a summary. The template-based method may use a template to represent a whole document. A set of linguistic patterns or extraction rules may be matched to identify text snippets that may then be mapped into template slots. These text snippets may be indicators of a summarized content. The ontology-based method techniques may include defining a domain ontology for the user data 544. This technique may map sentences to nodes of a hierarchical ontology. By considering ontology attributes, the system 110 may improve the semantic representation of a sentence's information content. The technique may further include a term classifier for classifying the ontology attributes based on content presented by the user data 544. Based on the classification of the ontology attributes, a process of distilling knowledge from ontology to produce an abridged version for a particular user may be implemented. The lead and body phrase method may be based on the operations of phrases (insertion and substitution) that may have the same syntactic head chunk in the lead and body sentences to rewrite the lead sentence. The rule-based method may include the documents to be summarized may be represented in terms of categories and a list of aspects. A content selection module may select the best aspects among the ones generated by information extraction rules to answer one or more aspects of a category. Additionally, a generation pattern may be used for the generation of summary sentences. For example, as mentioned above with reference to the example presented by way of FIG. 2 the extractive summarization may produce a story from the answers 230 received from the first question 215, the new question, and the subsequent questions from the question loop. The summarization produced by deploying the extractive summarization may be for example, "I would tell myself to stop worrying about unimportant things. I was doing good in school and had what I now know were good friends. I go to classical music concerts often. I used to play the piano all the time too, it was my main activity during my retirement. I stopped playing when I was a teenager because I was too busy with studies. Music was still a big part of my life, but I preferred to listen to music rather than play it. I worked less and had more time to give to music."

In an example, the semantic-based approach may include semantic representation of a document being used to feed into a natural language generation (NLG) system. This method may focus on identifying noun phrases and verb phrases by processing linguistic data and may further include multiple semantic models, an information item-based method, and a semantic graph-based method. The multimodal semantic model may include building a semantic model, which may capture concepts and relationship among concepts. The semantic model may be built to represent the contents (text and images) of multimodal documents. The important concepts may be rated based on a specified measure and finally, the selected concepts may be expressed as sentences to form a summary. The information item-based method may summarize a document abstract representation of source documents, rather than from sentences of source documents. The abstract representation may be an information item, which may be the smallest element of coherent information in a text. The semantic graph-based method may summarize a document by creating a semantic graph called a rich semantic graph of the original document. The method may further include reducing the generated semantic graph and then generating a final abstractive summary from the reduced semantic graph. For the sake of brevity and technical clarity and explanation of these models is not presented herein, however, a person skilled in the art will recognize the aforementioned techniques and their respective entailments.

In an example, the text summarizer 504 may transcribe, and analyze the user data 544 using the third artificial intelligent component 265 and generate a story 516. The text summarizer 504 may be powered by the third artificial intelligence component 265, and human intervention, which may aim at creating stories. The text summarizer 504 may summarize by extracting key elements of all user's answers.

The Internet scraper 506 may receive the story 516 from the text summarizer 504. The Internet scraper 506 may include a web crawler 518 and an image recognition component 520. Further, the Internet scraper 506 may interact with an Internet and social media component 542 for the identification of multimedia content 536. The multimedia content 536 may be related to the story 516. The Internet scraper 506 may deploy an algorithm such as for example, a Document Object Model (DOM) parser for interaction with an Internet and social media component 542. The Internet scraper 506 may associate the story 516 with the multimedia content 536 for the generation of a story with illustration 522. In an example, the Internet scraper 506 may identify any relevant multimedia content 536 that could be used to illustrate the story 516. The Internet scraper 506 may look for any relevant multimedia that could be used to illustrate the story 516. For example, as mentioned above, the story 516 illustrated by the way of FIG. 5B may be produced by the Internet scraper 506 from the summarizations produced by the extractive summarization method or the abstractive summarization method. The story 516 illustrated by way of FIG. 5B may be exemplary in nature and may be in continuation with the example for presented by way of FIG. 2.

The layout generator 508 may receive the story with illustration 522 from the Internet scraper 506. The layout generator 508 may further include a design generation component 524, and a virtual content optimizer 526. The design generation component 524 may create layout arrangement and visualization, and the virtual content optimizer 526 may improve layout arrangement and improve visualization. The layout generator 508 may convert the story 516 with illustration 522 into a formatted story 528. The formatted story 528 may include improved layout arrangement, improved visualization, and the like. The layout generator 508 may generate the layout, which may be any type of support such as a video, a book, a website, and the like. The layout generator 508 may generate layout using a design constructor algorithm. For example, as mentioned above, the formatted story 528 illustrated by the way of FIG. 5C may be produced by the layout generator 508 by converting the story 516 and the illustration 522 into the formatted story 528. The formatted story 528 illustrated in FIG. 5C may have the text corrected by the virtual content optimizer 526. The formatted story 528 may include a new image 546 to reflect the content from the formatted story 528. The formatted story 528 illustrated by way of FIG. 5C may be exemplary in nature and in continuation with the example for presented by way of FIG. 2.

The system 500 may be configured to initiate a manual verification and improvement 540 after the formatted story 528 may have been generated. The manual verification and improvement 540 may include a feedback 538, and a feedback 534. The manual verification and improvement 540 may create a feedback loop using the feedback 538 with the layout generator 508. The manual verification and improvement 540 may create a feedback loop using the feedback 534 with the text summarizer 504. A user 532 may manually modify the story 516, which may be generated by the text summarizer 504 using the feedback 534. The user 532 may manually modify the formatted story 528, which may be generated by the layout generator 508 using the feedback 538. In an example, the user 532 to manually modify the story 516, and the formatted story 528 may be a professional writer. In an example, the user 532 to manually modify the story 516, and the formatted story 528 may be the user 422. In an example, a user to manually modify the story 516, may be different from a user to manually modify the formatted story 528. The feedback 534, and the feedback 538 may continue to facilitate the generation of modifications in the story 516, and the formatted story 528 until the user 532 or the system 500 may deem the story 516, and the formatted story 528 as satisfactory. The formatted story 528 may be presented to the user 532 through a user interface 530 (illustrated by way of FIG. 7). In an example, the formatted story 528 may include a text that may be illustrated with relevant images and videos from the multimedia content 536. The formatted story 528 may be the summary report 290. The formatted story 528 may include the knowledge graph 290-A.

Figure 6:
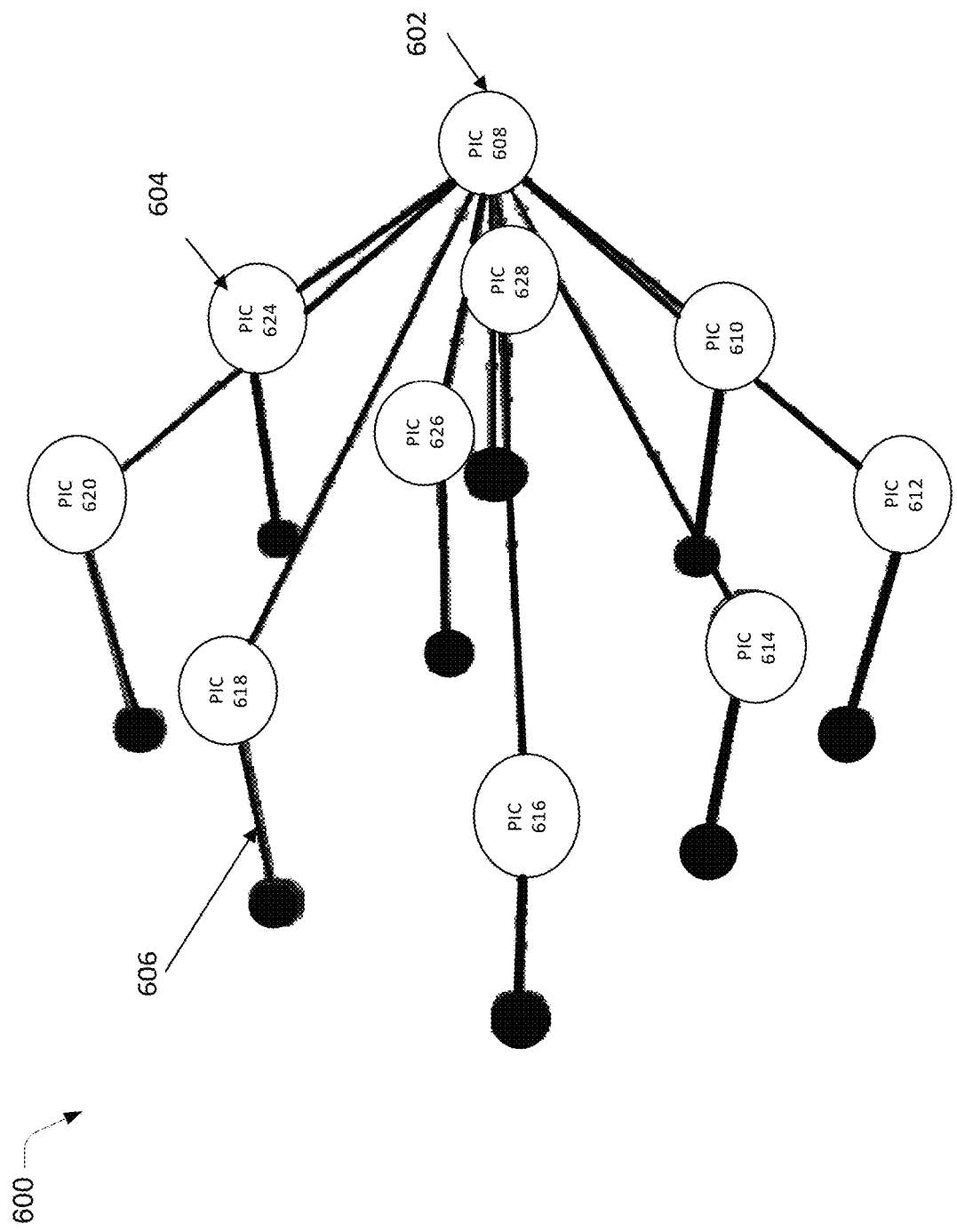
FIG. 6 illustrates a pictorial representation of a knowledge graph generated by the system for intelligent communication management for content summarization, according to an example embodiment of the present disclosure.

FIG. 6 illustrates a pictorial representation 600 of a knowledge graph 602 generated by the system 110 for intelligent communication management for content summarization, according to an example embodiment of the present disclosure. Any of the components described by FIG. 1 and FIG. 2 may be used for generating the pictorial representation 600. The knowledge graph 602 illustrated by FIG. 6 may be the knowledge graph 290-A. In an example, the data summarizer 140 may generate the knowledge graph 602 for each of the user-specific knowledge model 255, the knowledge graph 602 may include a visualization of the user-specific knowledge model 255. In an example, the knowledge graph 602 may be sourced by the data interviewer 130 for the enrichment of the user-specific knowledge model 255. The knowledge graph 602 may include a node 604. In accordance with an embodiment of the present disclosure, the knowledge graph 602 may include various nodes similar to the node 604. For sake of brevity and technical clarity, the term "node" may be used interchangeably with the term "various nodes". The node 604 of the knowledge graph 602 may be an information set. For example, the node 604 may be a text, an image, or a video. The 604 may be classified by the system 110 wherein, each information set may form a category. In an example, each category may be illustrated in a different color.

In an example, a link line 606 may be present between various nodes 604. The link lines 606 may depict a hierarchy or a link between various nodes 604 in the knowledge graph 602. In an example, the system 110 may collect and structure all the answers similar to the answer 304 provided by the user similar to the user 302 and will create a first knowledge graph similar to the knowledge graph 602, thereby allowing to efficiently store the answer 304 from the user 302 and facilitate the production of the story generation 318.

In an example, the node 604 may include (as illustrated by way of FIG. 6) a picture 608, a picture 610, a picture 612, a picture 614, a picture 616, a picture 618, a picture 620, a picture 622, a picture 624, and a picture 628. The picture 608, the picture 610, the picture 612, the picture 614, the picture 616, the picture 618, the picture 620, the picture 622, the picture 624, and the picture 628 may be assimilated by the Internet scraper 506 through the social media 542 and the multimedia content 536 as a part of the visualization of the user-specific knowledge model 255. In an example, the picture 608, the picture 610, the picture 612, the picture 614, the picture 616, the picture 618, the picture 620, the picture 622, the picture 624, and the picture 628 may be pictures various family members of a user, which may have assimilated by the system 300 for the user for generating a family tree. In an example, the picture 608, the picture 610, the picture 612, the picture 614, the picture 616, the picture 618, the picture 620, the picture 622, the picture 624, and the picture 628 may have been uploaded to the system 300 by the user for a specific purpose, for example, generation of a family tree. The picture 608, the picture 610, the picture 612, the picture 614, the picture 616, the picture 618, the picture 620, the picture 622, the picture 624, and the picture 628 may be pictures of geographical destinations, which may have been chronically arranged by a user for a specific purpose like creating a holiday memoir or generating a holiday planner.

In an example, the layout generator 508 may generate multiple layout patterns for the picture 608, the picture 610, the picture 612, the picture 614, the picture 616, the picture 618, the picture 620, the picture 622, the picture 624, and the picture 628 as per requirements presented by the user. In an example, the layout generator 508 may generate multiple layout patterns for the node 604 as per requirements presented by the user. Additionally, the user may present the requirements for the generation of the multiple layout patterns through the feedback 538. In accordance with various embodiments of the present disclosure, the data summarizer 140 may deploy the knowledge graph 602 for the generation of the augmented report 285. The augmented report 285 may be the formatted story 528.

Figure 7:
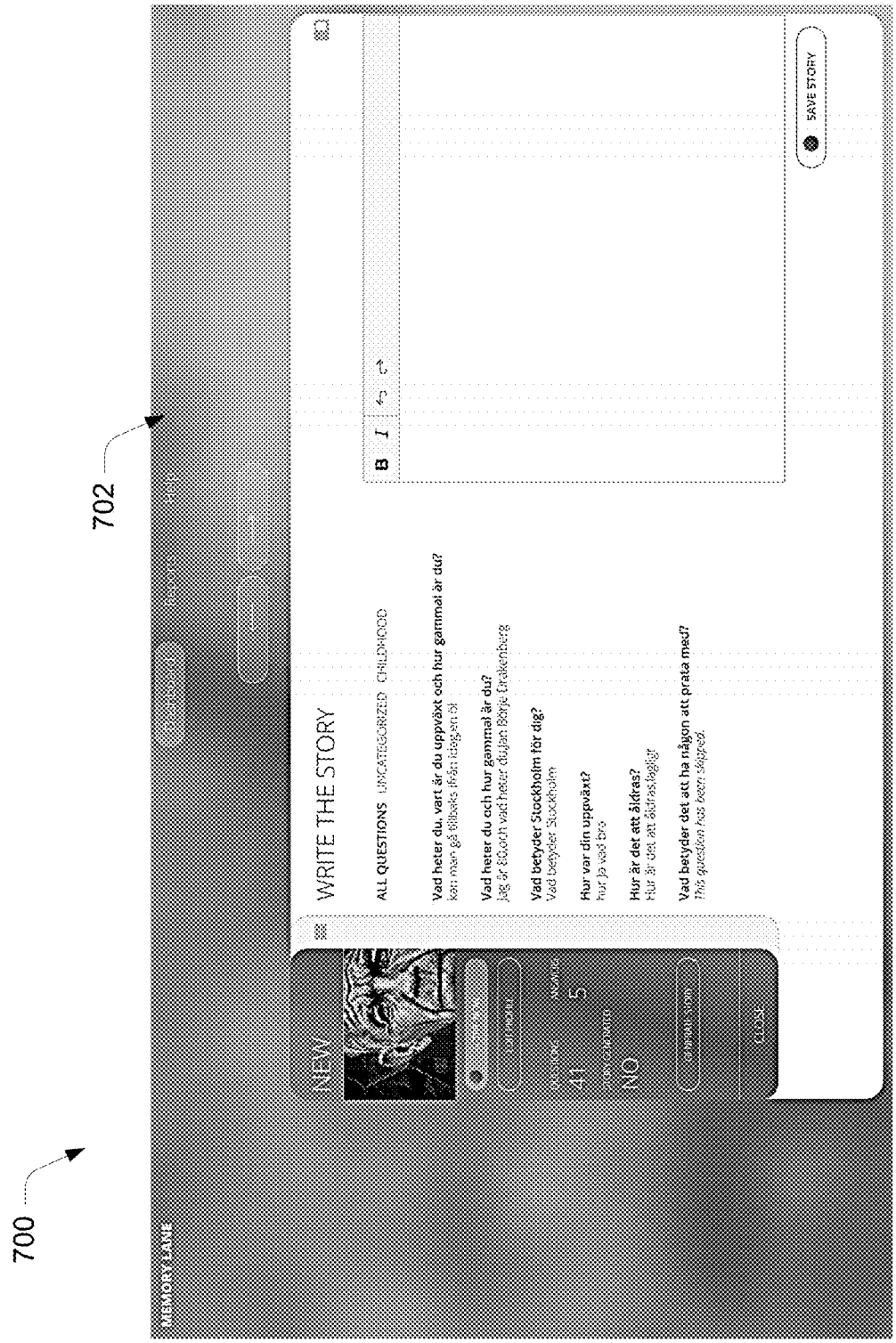
FIG. 7 illustrates a pictorial representation of an exemplary embodiment for the deployment of the system for intelligent communication management for content summarization, according to an example embodiment of the present disclosure.

FIG. 7 illustrates a pictorial representation 700 of an exemplary embodiment for the deployment of the system 110 for intelligent communication management for content summarization, according to an example embodiment of the present disclosure. The pictorial representation 700 may include a medium 702 that may be deployed by the system 110 to process the summary generation requirement 220. The medium 702 may be deployed to provide the first question 215, the new question, and the subsequent questions (as mentioned above) to a user of the system 110. In an example, the medium 702 may be deployed by the system 110 to obtain the answer 230 from a user of the system. The medium 702 may comprise information over a number of questions that may be included in the question database 240 for a specific user. The medium 702 may comprise the user-specific knowledge model 255 for a specific user. The medium 702 may provide the summary report 290 to the user. The medium 702 may provide the knowledge graph 290-A to the user. In accordance with various embodiments of the present disclosure, the medium 702 may be the user interface 530. For the sake of brevity, and technical clarity only an embodiment for the medium 702 may be presented herein, however, it should be clear to a person skilled in the art that the system 110 may deploy any medium such as the medium 702 processing the summary generation requirement 220.

Figure 8:
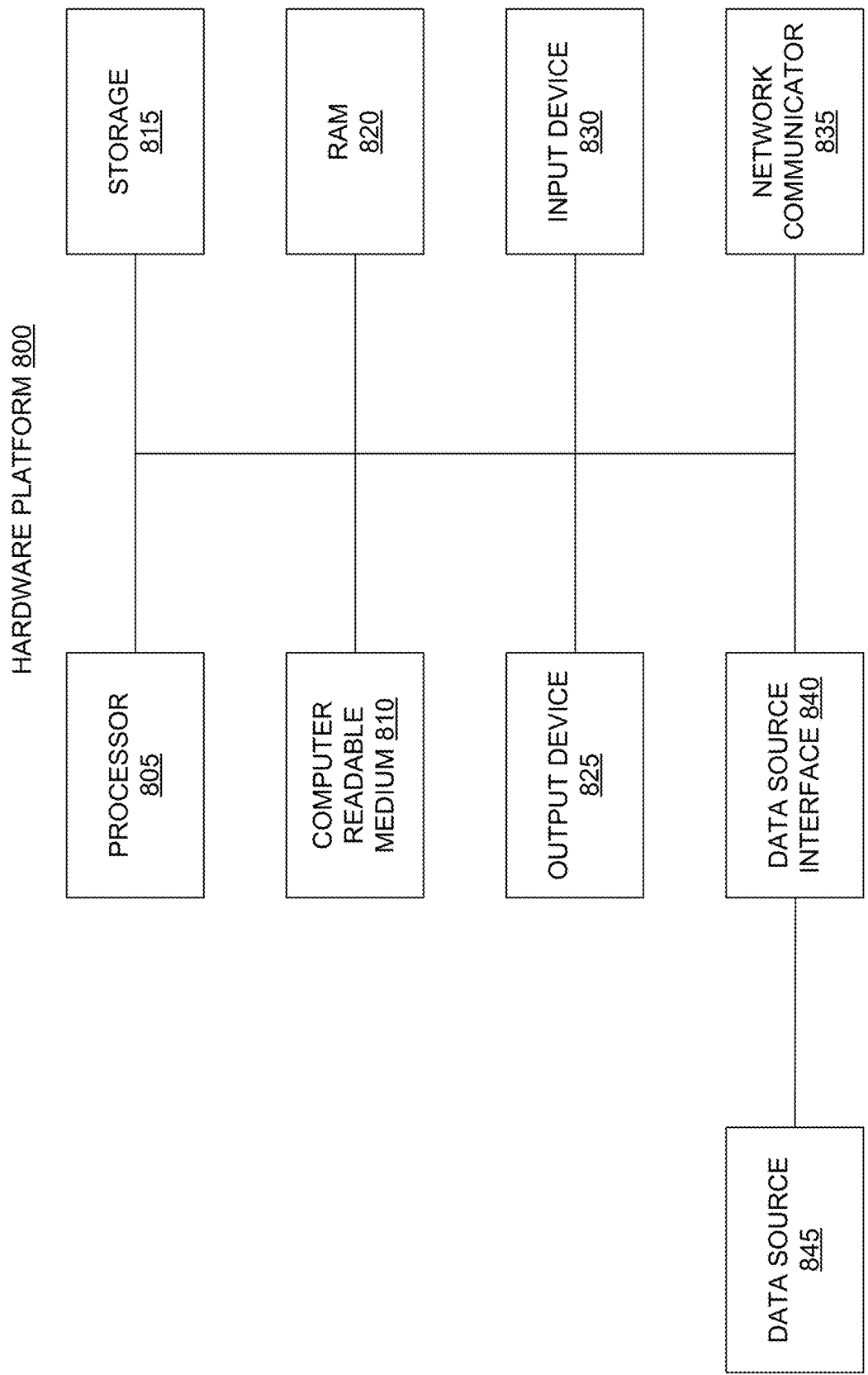
FIG. 8 illustrates a hardware platform for the implementation of the system, according to an example embodiment of the present disclosure.

FIG. 8 illustrates a hardware platform 800 for implementation of the system, according to an example embodiment of the present disclosure. The hardware platform 800 may be a computer system 800 that may be used with the examples described herein. The computer system 800 may represent a computational platform that includes components that may be in a server or another computer system 110. The computer system 800 may execute, by a processor (e.g., a single or multiple processors) or other hardware processing circuit, the methods, functions and other processes described herein. These methods, functions and other processes may be embodied as machine-readable instructions stored on a computer readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system 800 may include a processor 805 that executes software instructions or code stored on a non-transitory computer-readable storage medium 810 to perform methods of the present disclosure. The software code includes, for example, instructions to gather data and documents and analyze documents. In an example, the data interviewer 130, and the data summarizer 140 are software codes or components performing these steps.

The instructions on the computer-readable storage medium 810 are read and stored the instructions in storage 815 or in random access memory (RAM) 820. The storage 815 provides a large space for keeping static data where at least some instructions could be stored for later execution. The stored instructions may be further compiled to generate other representations of the instructions and dynamically stored in the RAM 820. The processor 805 reads instructions from the RAM 820 and performs actions as instructed.

The computer system 800 further includes an output device 825 to provide at least some of the results of the execution as output including, but not limited to, visual information to users, such as external agents. The output device can include a display on computing devices and virtual reality glasses. For example, the display can be a mobile phone screen or a laptop screen. GUIs and/or text are presented as an output on the display screen. The computer system 800 further includes input device 830, to provide a user or another device with mechanisms for entering data and/or otherwise interact with the computer system 800. The input device may include, for example, a microphone, a keyboard, a keypad, a mouse, or a touchscreen. In an example, the output of the system 110 may be displayed on the output device 825. Each of these output devices 825 and input devices 830 could be joined by one or more additional peripherals. In an example, the output device 825 may be used to display the results of the first artificial intelligence component 235, the second artificial intelligence component 245, and the third artificial intelligence component 265.

A network communicator 835 may be provided to connect the computer system 800 to a network and in turn to other devices connected to the network including other clients, servers, data stores, and interfaces, for instance. A network communicator 835 may include, for example, a network adapter such as a LAN adapter or a wireless adapter. The computer system 800 includes a data source interface 840 to access data source 845. A data source may be an information resource. As an example, a database of exceptions and rules may be a data source. Moreover, knowledge repositories and curated data may be other examples of data sources. In an example, the plurality of data sources 225 may be the data source 845.

Figure 9A:
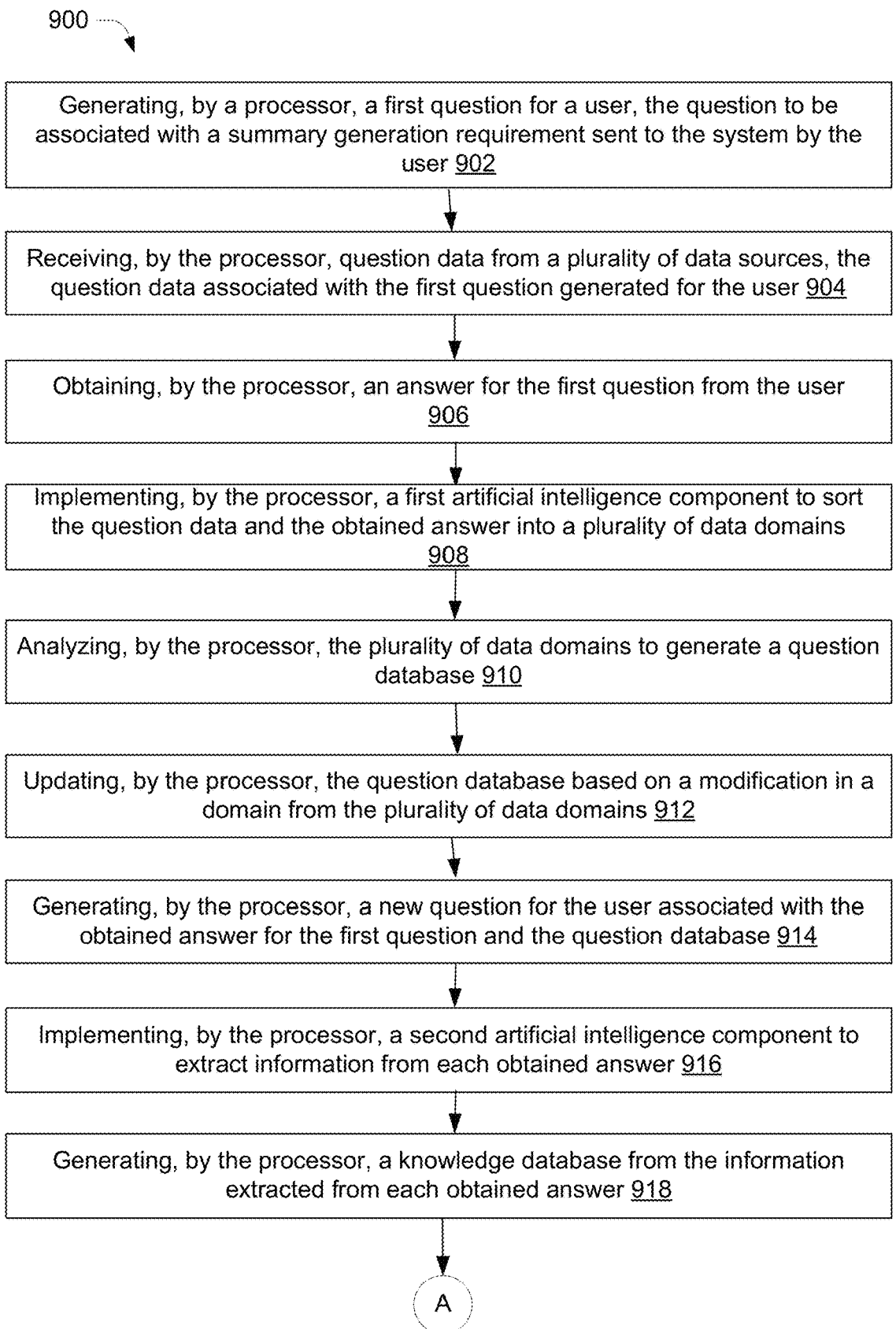
FIGS. 9A and 9B illustrate a method for intelligent communication management for content summarization, according to an example embodiment of the present disclosure.
Figure 9B:
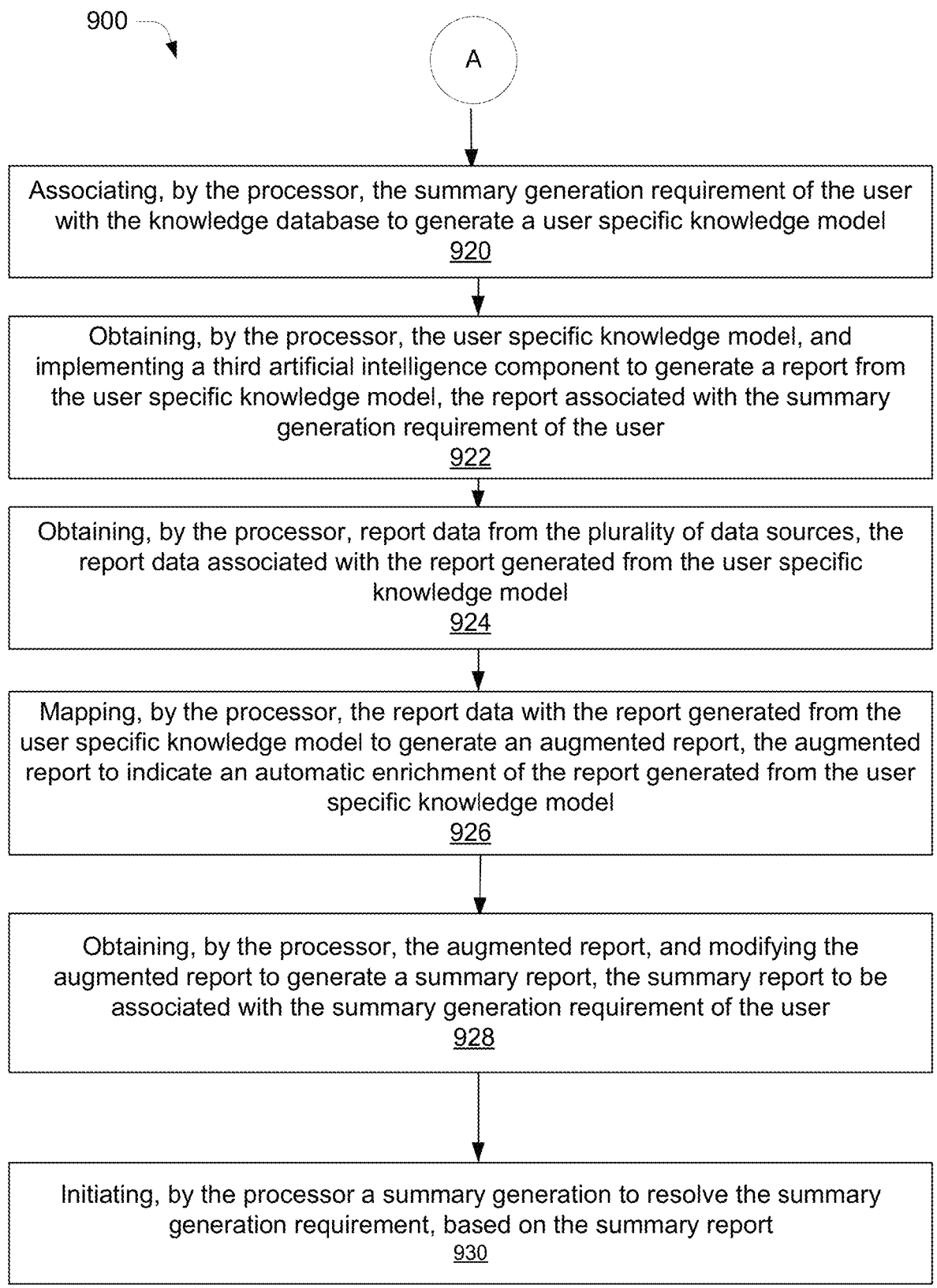

FIGS. 9A and 9B illustrate a method 900 for intelligent communication management for content summarization, according to an example embodiment of the present disclosure.

It should be understood that method steps are shown here for reference only and other combination of the steps may be possible. Further, the method 900 may contain some steps in addition to the steps shown in FIG. 9A and FIG. 9B. For the sake of brevity, construction and operational features of the system 110 which are explained in detail in the description of FIG. 1 to FIG. 7 are not explained in detail in the description of FIG. 9A and FIG. 9B. The method 900 may be performed by a component of the system 110, such as the processor 120, the data interviewer 130, and the data summarizer 140.

At block 902, the first question 215 may be generated for a user. The question may be associated with a summary generation requirement 220 sent to the system 110 by the user.

At block 904, question data may be received from the plurality of data sources 225. The question data may be associated with the first question 215 generated for the user. In accordance with various embodiments of the present disclosure, the plurality of data sources 225 may further comprise at least one of a text, an audio, an image, an animation, a video, and an interactive content.

At block 906, the answer 230 for the first question 215 may be obtained from the user. In accordance with various embodiments of the present disclosure, the answer 230 obtained from the user is to further include an audio input.

At block 909, the first artificial intelligence component 235 may be implemented to sort the question data and the obtained answer 230 into the plurality of data domains.

At block 910, the plurality of data domains may be analyzed to generate the question database 240.

At block 912, the question database 240 may be updated based on a modification in a domain from the plurality of data domains.

At block 914, a new question may be generated for the user associated with the obtained answer 230 for the first question 215 and the question database 240.

At block 916, the second artificial intelligence component 245 may be implemented to extract information from each obtained answer 230.

At block 918, the knowledge database 250 may be generated from the information extracted from each obtained answer 230.

At block 920, the summary generation requirement of the user may be associated with the knowledge database 250 to enrich the user-specific knowledge model 255.

At block 922, the user-specific knowledge model 255 may be obtained, and the third artificial intelligence component 265 may be implemented to generate a report 270 from the user-specific knowledge model 255. The report associated with the summary generation requirement 220 of the user.

At block 924, report data 280 may be obtained from the plurality of data sources 225. The report data 280 may be associated with the report generated from the user-specific knowledge model 255.

At block 926, the report data may be mapped with the report generated from the user-specific knowledge model to generate the augmented report 285. The augmented report 285 may indicate an automatic enrichment of the report generated from the user-specific knowledge model 255.

At block 928, the augmented report 285 may be obtained, and the augmented report 285 may be modified to generate the summary report 290. The summary report 290 to be associated with the summary generation requirement 220 of the user.

At block 930, the summary generation may be initiated to resolve the summary generation requirement 220, based on the summary report 290.

In accordance with various embodiments of the present disclosure, the method 900 may further comprise generating a knowledge graph for each of the user-specific knowledge model, wherein the knowledge graph comprises a visualization of the user-specific knowledge model. The method 900 may further comprise deploying the knowledge graph for generation of the augmented report. The method 900 may be configured so that the plurality of data sources may further comprise at least one of a text, an audio, an image, an animation, a video, and an interactive content. The method 900 may further comprise obtaining an input from the user-specific knowledge model to generate an update in the question database. The method 900 may further comprise updating the summary report based on an update in the knowledge database. The method 900 may include creating a question loop for generating the question database, the question loop may be based on the first question, the answer for the first question, and the new question.

In an example, the method 800 may be practiced using a non-transitory computer-readable medium. In an example, the system 110 may be a computer-implemented method.

In accordance with various embodiments of the present disclosure, the method 900 may further include generating the knowledge graph 290-A for each of the user-specific knowledge model 255, wherein the knowledge graph 290-A may comprise a visualization of the user-specific knowledge model 255. The method 900 may include deploying the deploy the knowledge graph 290-A for the generation of the augmented report 285. In accordance with various embodiments of the present disclosure, the first artificial intelligent component 235 may obtain input from the user-specific knowledge model 255 to generate an update in the question database 240. The method 900 may include providing the summary report 290 to the user as a content form comprising at least one of a text, an audio, an image, an animation, a video, and an interactive content.

The present disclosure provides for intelligent communication management for content summarization. The present disclosure may substantially reduce the time required in generating summary reports and responding to market opportunities. The present disclosure for intelligent communication management for content summarization may eliminate substantial time spent on labor-intensive analysis, providing a huge boost in agility, responsiveness, and productivity.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

We claim:

1. An intelligent communications manager and summarizer system comprising:
a processor;
a data interviewer coupled to the processor, the data interviewer comprising:
a question creator to:

generate a first question for a user, the first question being associated with a summary generation requirement sent to the system by the user;

receive question data from a plurality of data sources, the question data being associated with the first question generated for the user;

obtain an answer for the first question from the user;

implement a first artificial intelligence component to sort the question data and the obtained answer into a plurality of data domains;

generate a question database by analyzing the plurality of data domains;

update the question database based on a modification in a domain from the plurality of data domains; and generate a new question for the user on-the-fly with keywords extracted from the obtained answer for the first question and the question database;

store the new question in the question database; and an answer analyzer to:

implement a second artificial intelligence component to extract information from each answer obtained from the user for questions in the question database;

generate a knowledge database from the information extracted from each obtained answer; and associate the summary generation requirement of the user with the knowledge database to enrich a user-specific knowledge model;

a data summarizer coupled to the processor, the data summarizer comprising:

a text summarizer implementing a third artificial intelligence component that generates a report from the user-specific knowledge model by extracting one or more sentences of text, the report being associated with the summary generation requirement of the user;

an internet scraper that interacts with one or more of the plurality of data sources including social media sources and extracts multimedia content related to the report from the one or more data sources; and a layout generator to:

generate a visualization of a knowledge graph representing the user-specific knowledge model, automatically generate a summary report as one of a digital book, a website and a video by converting the report and the multimedia content into a formatted story in accordance with one of multiple supported layouts, and enable displaying on an output device in the selected layout, one or more of the knowledge graph and the formatted story.

2. The system as claimed in claim 1, wherein each node of the knowledge graph includes one of the text or multimedia content related to the report.

3. The system as claimed in claim 1, wherein the data summarizer coupled to the processor further comprises:

a data assembler to:

obtain report data from the plurality of data sources, the report data being associated with the report generated from the user-specific knowledge model; and map the report data with the report generated from the user-specific knowledge model to generate the augmented report, the augmented report to indicate an automatic enrichment of the report generated from the user-specific knowledge model.

4. The system as claimed in claim 3, wherein the layout generator is further:

to obtain the augmented report from the data assembler and modify the augmented report to generate a summary report, the summary report being associated with the summary generation requirement of the user.

5. The system as claimed in claim 4, wherein the data summarizer coupled to the processor further comprises:

a modeler coupled to the processor, the modeler to initiate a summary generation to resolve the summary generation requirement, based on the summary report.

6. The system as claimed in claim 1, wherein the data summarizer is to further deploy the knowledge graph for generation of an augmented report.

7. The system as claimed in claim 1, wherein the plurality of data sources further comprises at least one of a text, and the multimedia content including one or more of an audio, an image, an animation, a video, and an interactive content.

8. The system as claimed in claim 1, wherein the first artificial intelligent component is to further obtain an input from the user-specific knowledge model to generate an update in the question database.

9. The system as claimed in claim 1, wherein the data summarizer is to further update the summary report based on an update in the knowledge database.

10. The system as claimed in claim 1, wherein the question creator is to create a question loop for generating the question database, the question loop being on at least one of the first question, the answer for the first question, and the new question.

11. A method comprising:

generating, by a processor, a first question for a user, the question being associated with a summary generation requirement sent to a system by the user;

receiving, by the processor, question data from a plurality of data sources, the question data being associated with the first question generated for the user;

obtaining, by the processor, an answer for the first question from the user;

implementing, by the processor, a first artificial intelligence component to sort the question data and the obtained answer into a plurality of data domains;

generating, by the processor, a question database by analyzing the plurality of data domains;

updating, by the processor, the question database based on a modification in a domain from the plurality of data domains;

generating, by the processor, a new question for the user on-the-fly with keywords extracted from the obtained answer for the first question and the question database;

storing, by the processor, the new question in the question database;

implementing, by the processor, a second artificial intelligence component to extract information from each obtained answer;

generating, by the processor, a knowledge database from the information extracted from each answer obtained from the user for questions in the question database;

associating, by the processor, the summary generation requirement of the user with the knowledge database to enrich a user-specific knowledge model;

obtaining, by the processor, the user-specific knowledge model and implementing a third artificial intelligence component that generates a report from the user-specific knowledge model by extracting one or more sentences of text, the report associated with the summary generation requirement of the user;

extracting, by the processor, multimedia content related to the report from one or more of the plurality of data sources by interacting with the one or more data sources including social media sources;

generating, by the processor, a visualization of a knowledge graph representing the user-specific knowledge model;

automatically generating, by the processor, a summary report as one of a digital book, a website and a video by converting the report and the multimedia content into formatted story in accordance with one of multiple supported layouts, and enabling, by the processor, a display on an output device in the selected layout, one or more of the knowledge graph and the formatted story.

12. The method as claimed in claim 11, wherein the method deploying the knowledge graph for generation of an augmented report.

13. The method as claimed in claim 11, wherein the plurality of data sources further comprises at least one of a text, and the multimedia content including one or more of an audio, an image, an animation, a video, and an interactive content.

14. The method as claimed in claim 11, wherein the method further comprise obtaining, by the processor, an input from the user-specific knowledge model to generate an update in the question database.

15. The method as claimed in claim 11, wherein the method further comprise updating, by the processor, the summary report based on an update in the knowledge database.

16. The method as claimed in claim 11, wherein the method further comprise creating, by the processor, a question loop for generating the question database, the question loop being based on at least one of the first question, the answer for the first question, and the new question.

17. A non-transitory computer readable medium including machine readable instructions that are executable by a processor to:

generate a first question for a user, the question being associated with a summary generation requirement sent to a system by the user;

receive question data from a plurality of data sources, the question data being associated with the first question generated for the user;

obtain an answer for the first question from the user;

implement a first artificial intelligence component to sort the question data and the obtained answer into a plurality of data domains generate a question database by analyzing the plurality of data domains;

update the question database based on a modification in a domain from the plurality of data domains;

generate a new question for the user on the fly with keywords extracted from the obtained answer for the first question and the question database;

store the new question in the question database;

implement a second artificial intelligence component to extract information from each obtained answer;

generate a knowledge database from the information extracted from each answer obtained from the user for questions in the question database;

associate the summary generation requirement of the user with the knowledge database to enrich a user-specific knowledge model;

obtain the user-specific knowledge model and implement a third artificial intelligence component that generates a report from the user-specific knowledge model by extracting one or more sentences of text, the report associated with the summary generation requirement of the user;

extract multimedia content related to the report from one or more of the plurality of data sources by interacting with the one or more data sources including social media sources;

generate a visualization of a knowledge graph representing the user-specific knowledge model;

automatically generate a summary report as one of a digital book, a website and a video by converting the report and the multimedia content into a formatted story in accordance with one of multiple supported layouts, and enable a display on an output device in the selected layout, one or more of the knowledge graph and the formatted story.

18. The non-transitory computer-readable medium of claim 17, wherein the plurality of data sources further comprises at least one of a text, and the multimedia content including one or more of an audio, an image, an animation, a video, and an interactive content.

19. The non-transitory computer-readable medium of claim 17, wherein the processor is to update the summary report based on an update in the knowledge database.

20. The non-transitory computer-readable medium of claim 17, wherein the processor is to create a question loop for generating the question database, the question loop being based on at least one of the first question, the answer for the first question, and the new question.

* * * * *